(12) United States Patent
Townsend, Jr. et al.

(10) Patent No.: US 10,244,767 B2
(45) Date of Patent: Apr. 2, 2019

(54) FORMATIVE STRUCTURAL CAKE SYSTEM

(71) Applicant: Cake Effects LLC, Lake Wales, FL (US)

(72) Inventors: Robert E. Townsend, Jr., Lake Wales, FL (US); Elizabeth Townsend, Lake Wales, FL (US)

(73) Assignee: Cake Effects LLC, Lake Wales, FL (US)

( * ) Notice: Subject to any disclaimer, the term of this patent is extended or adjusted under 35 U.S.C. 154(b) by 0 days.

(21) Appl. No.: 15/710,545

(22) Filed: Sep. 20, 2017

(65) Prior Publication Data

US 2018/0077939 A1    Mar. 22, 2018

Related U.S. Application Data

(60) Provisional application No. 62/397,553, filed on Sep. 21, 2016, provisional application No. 62/398,133, filed on Sep. 22, 2016, provisional application No. 62/447,497, filed on Jan. 18, 2017, provisional application No. 62/483,996, filed on Apr. 11, 2017, provisional application No. 62/491,950, filed on Apr. 28, 2017, provisional application No. 62/505,566, filed on May 12, 2017.

(51) Int. Cl.
*A21B 3/13* (2006.01)
*A47J 37/01* (2006.01)

(52) U.S. Cl.
CPC .............. *A21B 3/132* (2013.01); *A21B 3/136* (2013.01); *A21B 3/138* (2013.01); *A21B 3/139* (2013.01); *A47J 37/01* (2013.01)

(58) Field of Classification Search
CPC ......... A21B 3/132; A21B 3/136; A21B 3/139; A21B 3/138

USPC .......... 99/426, 428, 439; 426/104, 107, 138, 426/389, 549
See application file for complete search history.

(56) References Cited

U.S. PATENT DOCUMENTS

| | | | |
|---|---|---|---|
| 3,503,345 A | 3/1970 | Abrams |
| 3,537,866 A | 11/1970 | Weller |
| 5,408,920 A | 4/1995 | Sosniecki |
| 5,499,914 A | 3/1996 | Rist |
| 6,432,461 B1 | 8/2002 | Dixon |
| 7,163,185 B2 | 1/2007 | Dail |
| 7,303,712 B2 | 12/2007 | Kitamura et al. |
| 7,314,590 B2 | 1/2008 | Yaeger |
| 8,012,522 B2 | 9/2011 | Ornelaz, Jr. et al. |

(Continued)

FOREIGN PATENT DOCUMENTS

| FR | 2692444 A1 | 12/1993 |
|---|---|---|
| GB | 2226225 A | 6/1990 |
| GB | 2439715 A | 1/2008 |

OTHER PUBLICATIONS

Make It & Love It website post, "Make-a-Cake Series"; www.makeit-loveit.com/2010/05/baking-stacking-and-icing.html; May 18, 2010; 32 pages.

(Continued)

*Primary Examiner* — Thien S Tran
(74) *Attorney, Agent, or Firm* — Brinks Gilson & Lione

(57) ABSTRACT

Methods and mold systems for an edible composition that minimize both compression forces (weight of inner portion and/or covering acting upon itself) and lateral forces (relative to moving/handling an edible composition) are provided.

11 Claims, 17 Drawing Sheets

(56) References Cited

U.S. PATENT DOCUMENTS

| | | |
|---|---|---|
| 2004/0076727 A1 | 4/2004 | L'Hommedieu |
| 2005/0031752 A1 | 2/2005 | Koplish |
| 2005/0202132 A1 | 9/2005 | Wolever et al. |
| 2008/0020120 A1 | 1/2008 | O'Donnell |
| 2008/0254172 A1 | 10/2008 | Woodhouse et al. |
| 2010/0080871 A1 | 4/2010 | Doty |
| 2011/0151095 A1 | 6/2011 | Abraham et al. |
| 2014/0141151 A1* | 5/2014 | Wirth ............... A21B 3/131 426/653 |
| 2014/0287102 A1 | 9/2014 | Gustav et al. |
| 2015/0181892 A1 | 7/2015 | McMunn |
| 2016/0345601 A1 | 12/2016 | Tommer |

OTHER PUBLICATIONS

Yahoo! Answers webpage; "Making a layer cake and freezing the layers before frosting?"; ca.answers.yahoo.com/question/index?qid=20070616062514AA0wlz; Jun. 2007; 2 pages.

Salessa Icing Tips Website identified as www.saessa.com.za/index.php?option=com_content&view=article&id=21&Itemid=86; "Mold Inspection & Testing"; Jun. 28, 2012; 2 pages.

International Search Report dated Nov. 27, 2017 for International Application No. PCT/US2017/052428.

Written Opinion dated Nov. 27, 2017 for International Application No. PCT/US2017/052428.

* cited by examiner

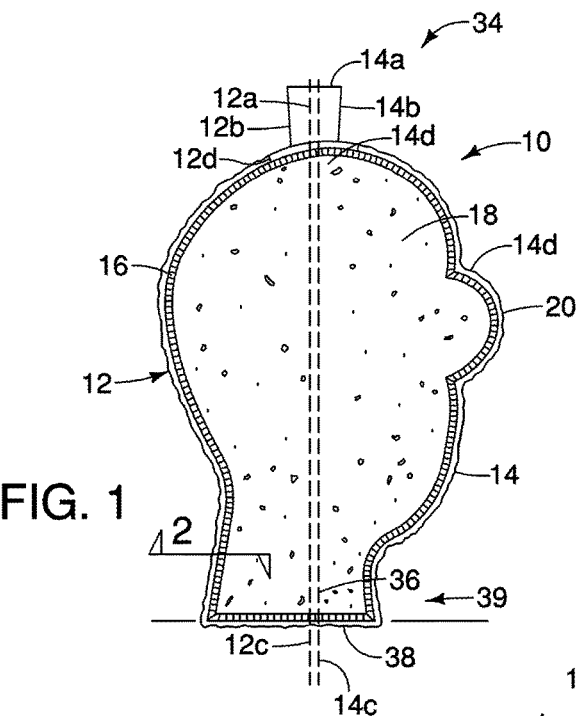
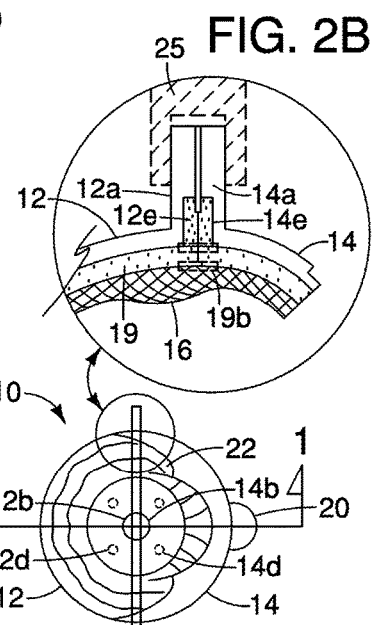
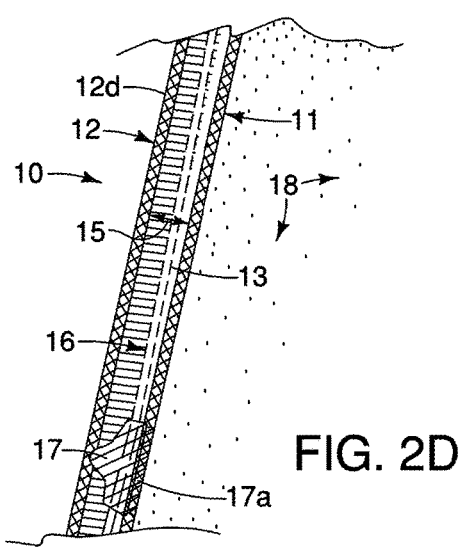
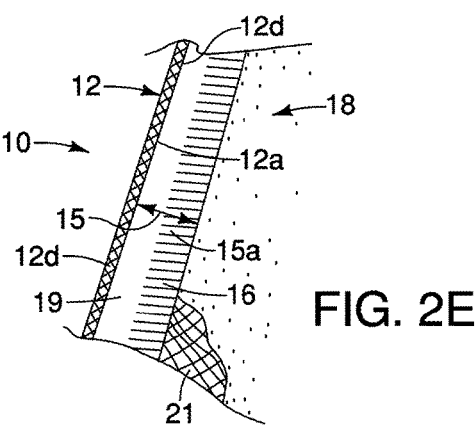

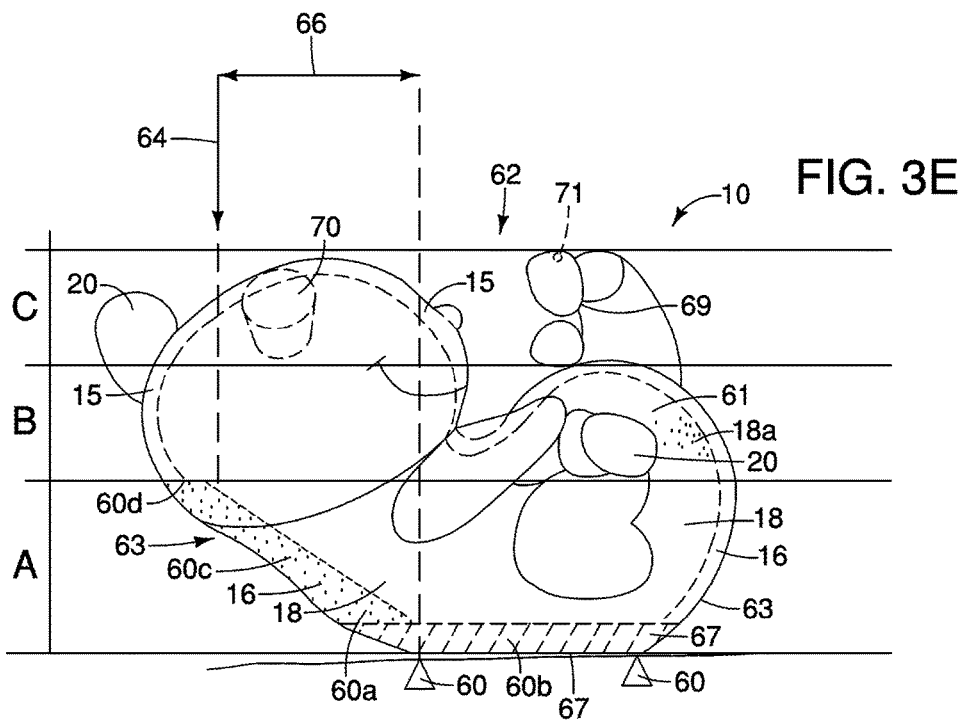
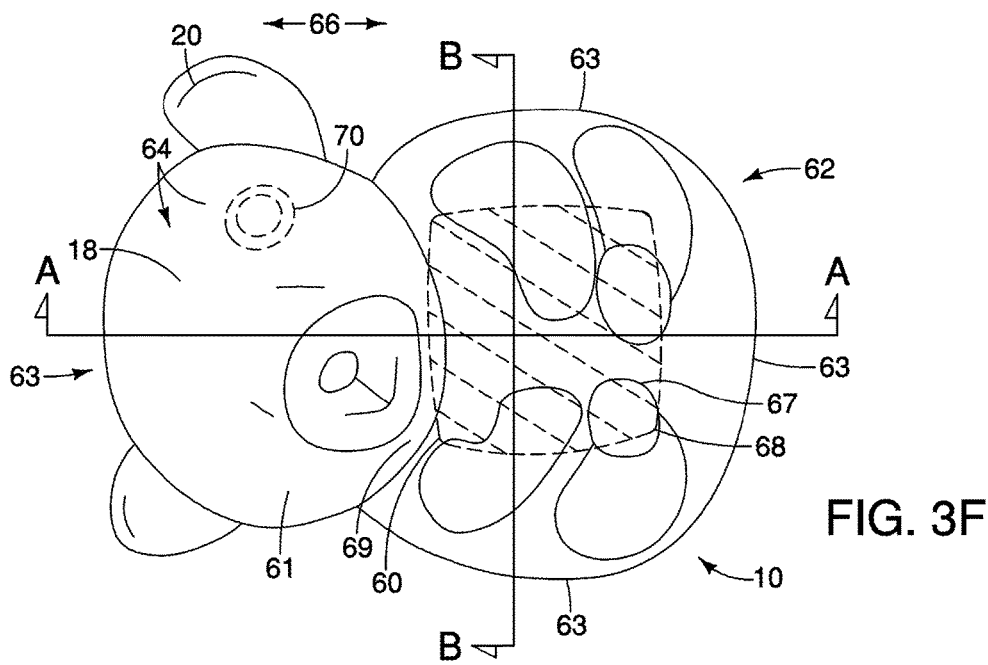

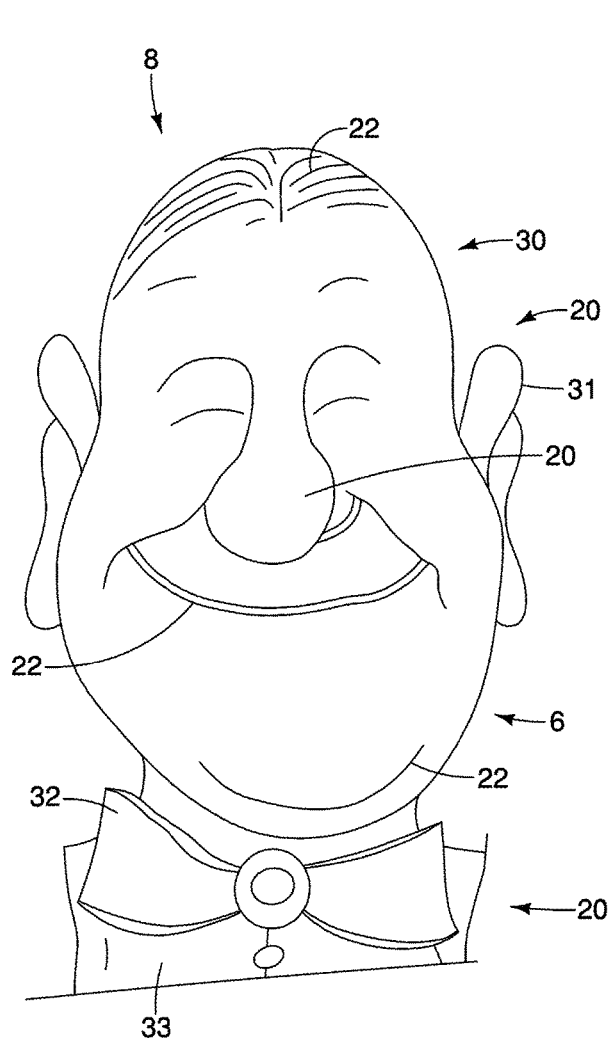
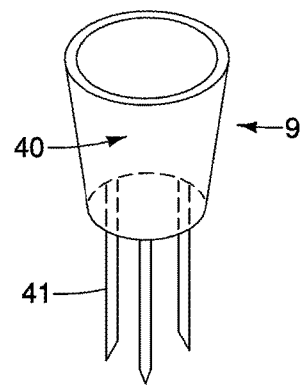
FIG. 5
FIG. 4

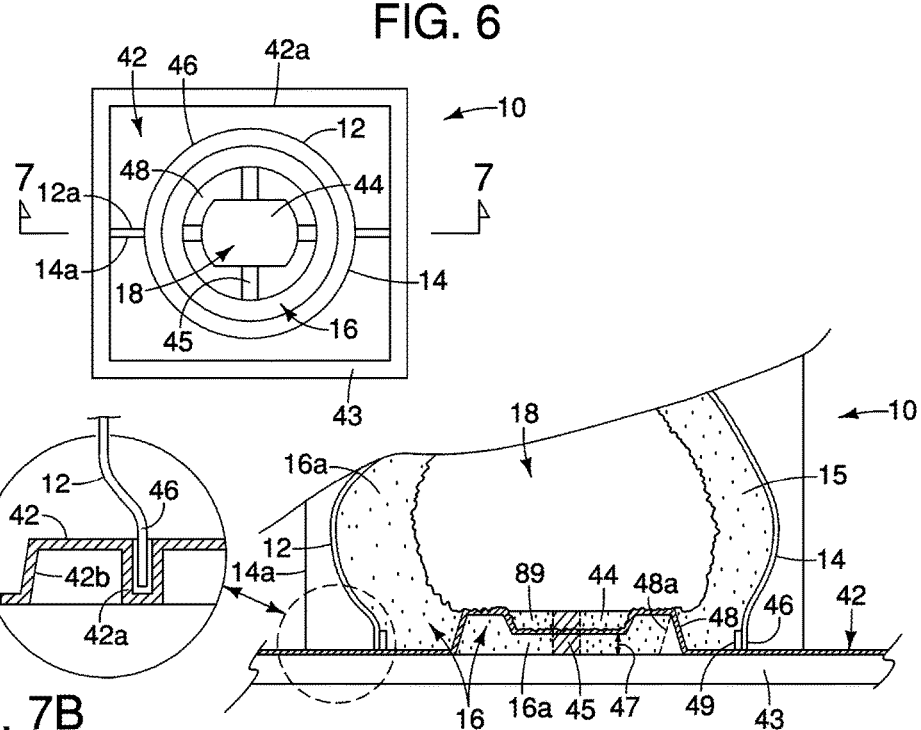
FIG. 6
FIG. 7B
FIG. 7A
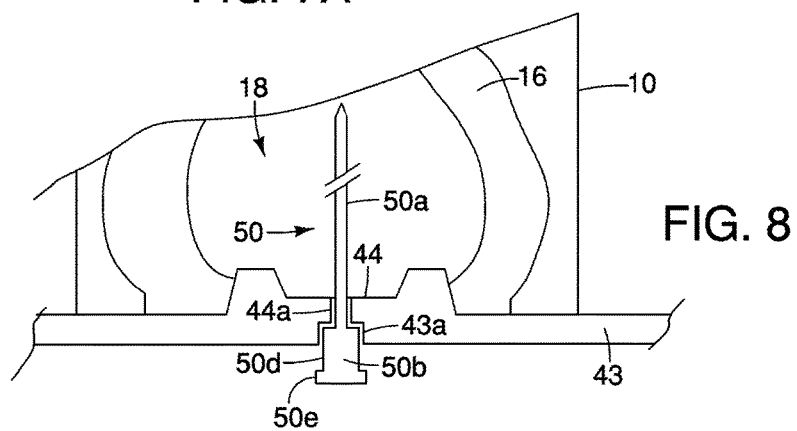
FIG. 8

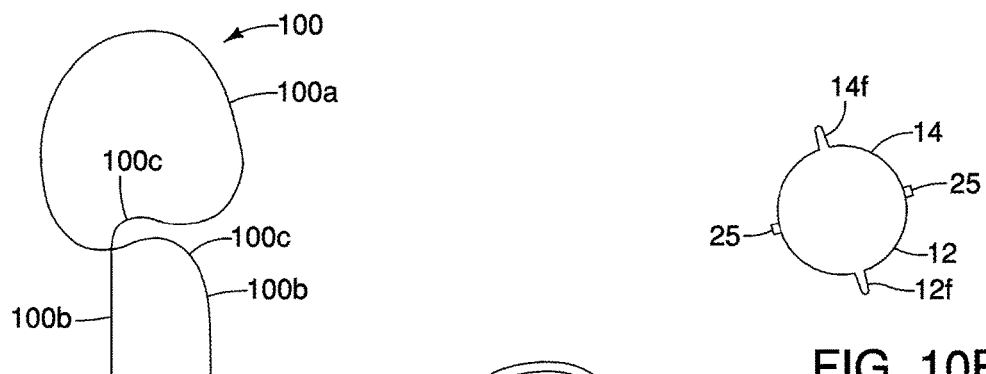
FIG. 9
FIG. 10B
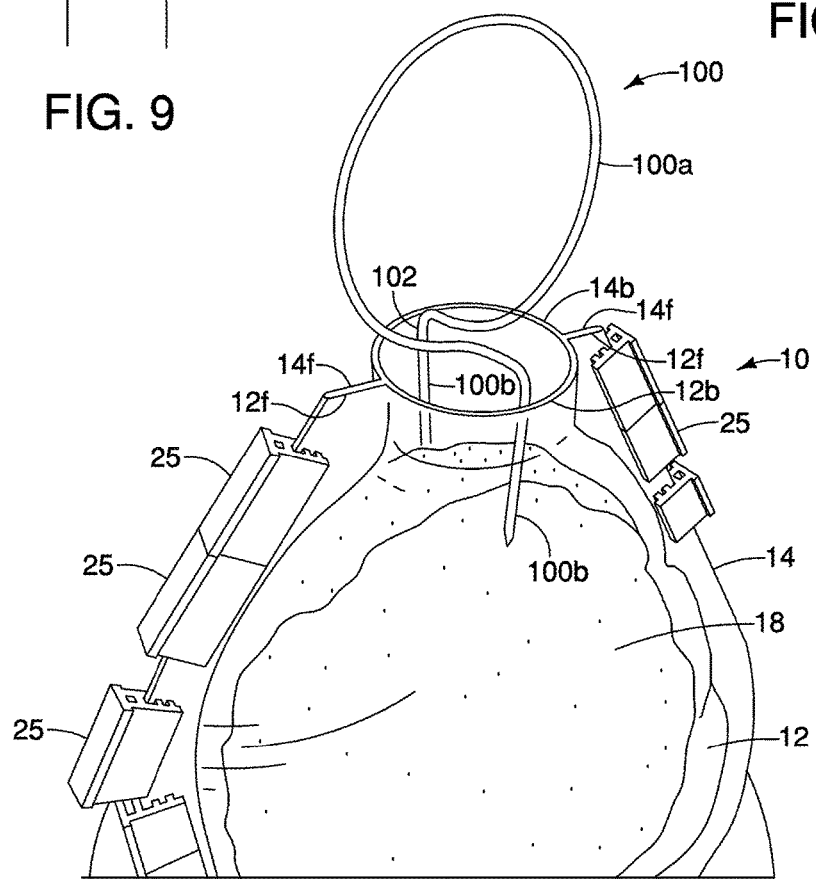
FIG. 10A

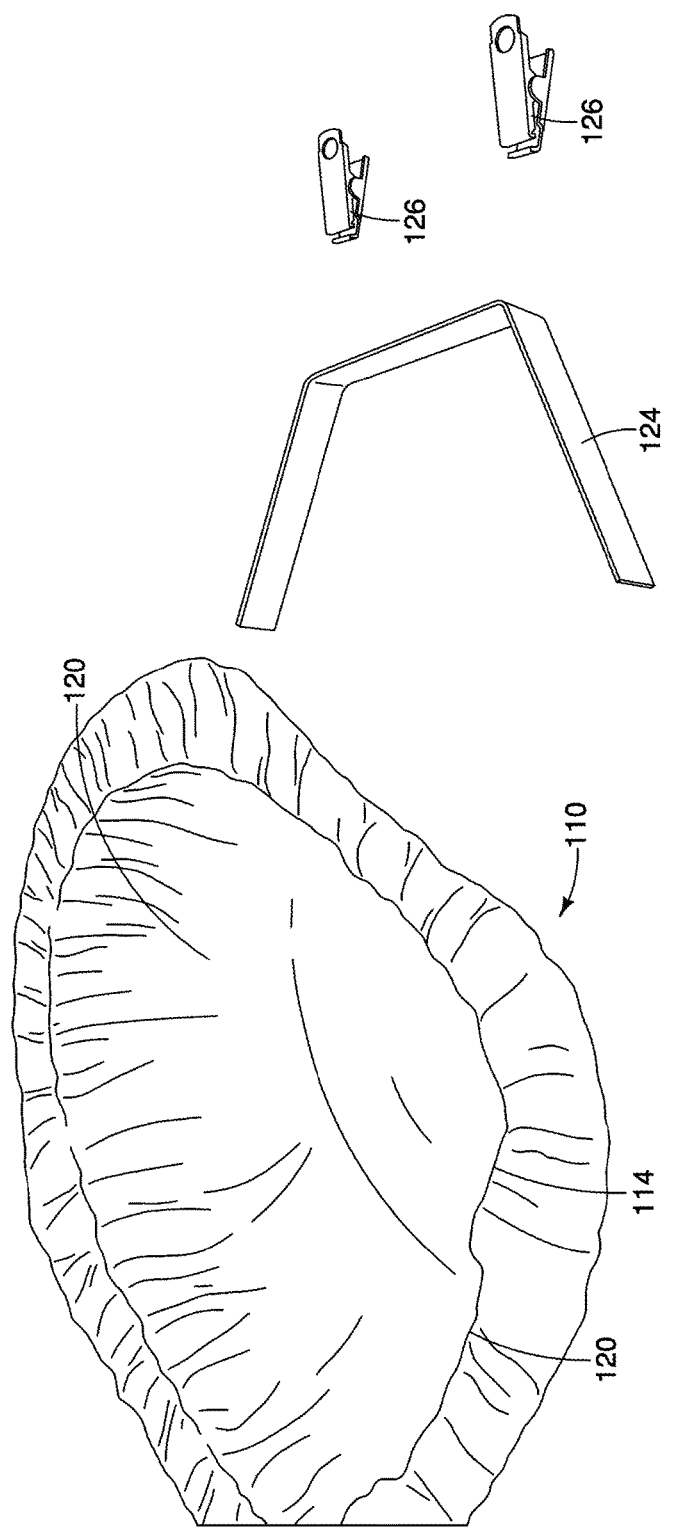

TABLE 4
PROCESS FLOW CHART
SINGLE ARCHITECTURE (NON-AUTOMATED)
SCULPTED ICE CREAM CAKES - FONDANT COVERED

Table 1 - Strength-to-weight ration - STWR

FORMATIVE STRUCTURAL CAKE SYSTEM

RELATED APPLICATIONS

This application claims the benefit of the filing date under 35 U.S.C. § 119(e) of Provisional U.S. Application Ser. Nos. 62/397,553, filed Sep. 21, 2016; 62/398,133, filed Sep. 22, 2016; 62/447,497, filed Jan. 18, 2017; 62/483,996, filed Apr. 11, 2017; 62/491,950, filed Apr. 28, 2017 and 62/505,566, filed May 12, 2017, which are hereby incorporated by reference in their entirety.

BACKGROUND

1. Technical Field

The disclosure relates to mold systems and methods for forming an edible composition having a formative structure.

2. Background

Creating and constructing large decorative cakes has been restrictive in size and at best a major challenge for the cake designer. Market and consumer interest has grown rapidly over the last few years demanding non-standard, more dimensional custom cakes.

Cake is a wonderful artistic medium to work with, but every experienced baker will tell you that to get a cake to stand tall without having internal supports is impossible. Cake is a soft squishy mass that does not do well when the cake is layered greater than three layers high. Typically, cakes with three or more layers are tiered cakes with dowels in between. No matter the type of batter, instability of the cake layers still exists. Even a cake with a thick coating of frosting is still likely to wobble and fall over. In order to reduce the instability, tall sculpted cakes need to be really wide at the bottom and narrow on top.

A multi-tiered cake receives more attention because of its 'heightened presence'. Another reason for wanting a bigger/taller cake is to have more servings. Making a one tier cake (flat in nature) to feed 150 will take up a lot of table space as opposed to making a five tier cake (tall in nature) that can provide as many servings as a flat cake using a smaller amount of table space.

The most important thing to consider when constructing a stacked/multi-tiered cake is the support. Adequate support is always needed to make sure that the cake layer (constructed upon a typical cake disc/board) that will be stacked and will not sink into the layer underneath it. Dowel rods are essential to support the weight of each additional tier as the cake is built up. To stack a cake using dowels as support, there are different kinds of dowels that can be used to support the cake, wood, hollow plastic, plastic straws and even skewers. Straws are for shorter cakes that are not required to support so much weight. Also used for support are bubble tea straws and thicker wooden dowels. All of these supports must be food safe.

Other support systems include elaborate plastic or metal pipes arranged to resist both gravitational and lateral forces. However, the ability of these other support systems to resist either of the gravitational and lateral forces is dependent upon a base connection that on average is 16 to 20 times less in circumference than that of the cake. As the cake becomes taller as layers are added, the stability of the cake, especially side to side stability, is greatly diminished.

Additional challenges for cake crafters include the structural issues with utilizing rolled fondant covering; such as support for decorative features, air entrapment causing problematic bubbles and adherence to flat areas as well as shapes having adverse large surface projections that are subject to gravitational forces.

General Properties of Cake and Frosting

Cake after baking is very fragile and crumbly. Cake itself as a structural support is very weak due to (a) having a composition comprised primarily of flour, sugar and oil such as shortening; and (b) being purposely soft for easier consumption.

Cake bakers have a large number of frostings to use for specific purposes, many of them variations on buttercream. Frosting is usually used to coat the outside of the cake for taste and decorative purposes. Frosting has a buttercream-like texture and a more buttery taste. Icing is generally used to glaze pastries or cakes, and tastes more sugary than frosting. The Williams-Sonoma cookbook, 'cake' states that "icing is generally thinner and glossier," while its counterpart, frosting, is "a thick, fluffy mixture, used to coat the outside of a cake. In the 16th century, a French baker first frosted a multi-layered cake and the most lasting use for frosting was born; e.g. a one-layer cake does not need frosting in the same way that many layers use frosting to hold the entire cake together. Finished cakes (baked, frosted and decorated) are sometimes frozen after completion and therefore more rigid for a limited time only for transport purposes, but must be un-frozen prior to consumption. Cakes are generally not intended to be eaten while frozen and once thawed, the thawed cake no longer has any strength benefit from freezing.

General Properties of Chocolate

For purposes of this disclosure, liquefied chocolate (defined as having paste-like to pourable consistency) can be utilized in many formations based upon height, general shape and cantilevered portions that are desired in the final cake structure. For example, in some embodiments it may be preferable to aid the distribution of chocolate into a mold system as described herein, particularly between an inner surface of the mold or a fondant veneer and the cake using liquefied chocolate. In other embodiments the chocolate mixture is heated until it reaches a plastic stage and is used in a paste-like application prior to solidifying. In yet other embodiments, other paste-like products such as florist paste (gum paste), Mexican modeling paste, pastillage, sugar dough, Marzipan or even other mixtures or compounds may be suitable also. To increase flowability of the chocolate or other paste-like products, oils like coconut, vegetable even canola, shortening, butter, milk, various types of creams such as heavy cream generally used to make chocolate glazes such as ganache may also be included. In some embodiments, paramount crystals may also be used.

Compression is one of the most common factors in determining a food product's softness and elasticity. The strength-to-weight ratio (STWR) is:

$$\frac{\text{STRENGTH (force per unit area at failure)}}{\text{DENSITY (weight divided by volume)}}$$

For example: Typical cake has a STWR of about 305.6 that is approximately 15.2 times lower/weaker than chocolate that has a STWR of about 4,646.6. Typical frosting has a STWR of about 41.3 that is approximately 7.4 times lower/weaker than cake and 112.5 times lower than chocolate. Fondant has a STWR of about 293.3 that is approximately 16 times lower/weaker than chocolate.

Compression plays a major role in constructing most everything. For example, when a tall object experiences a lateral force, the side furthest away goes into compression (downward) and the side closest to the force experiences tensile stress (pulling upward). For a tall cake (or its coatings), the ability of the cake to resist the compression is very little, especially with both the weight load and tilting loads, each being concentrated. The inability of the cake to resist the tensile load is evidenced by the above STWR Table and the ease with which the cake can be cut or eaten with a fork. As described herein, by encapsulating a cake core, the cake core will not only resist the initial lateral loading, but also the harmful concentrated compression loads, and in some embodiments, the encapsulated cake core can support cantilevered gravity-induced loads.

BRIEF SUMMARY

Methods and mold systems for an edible composition that minimize both compression forces (weight of inner portion and/or covering acting upon itself) and lateral forces (relative to moving/handling an edible composition) are provided.

Methods of preparing an edible composition having an inner portion and an outer portion are provided. The method includes placing the inner portion of the edible composition in a mold system, the mold system including an interior space, the interior space having a volume that is greater than a volume of the inner portion of the edible composition and positioning the inner portion in the interior space so that a cavity is formed between the inner portion and at least a portion of a wall of the mold system forming the interior space. The method further includes filling at least a portion of the cavity with the outer portion of the edible composition, the outer portion comprising a first flowable food product and solidifying the first flowable food product in the mold system so that the first flowable food product forms a support hull for the inner portion so that the support hull restricts lateral movement of the inner portion.

In another aspect, methods of preparing an edible composition are provided, the methods include filling at least a portion of a cavity formed in a first mold portion of a mold system with a pliable fondant layer. The method further includes vacuum forming or pressing the first flowable food product to conform to an interior surface of the first mold portion; coating at least a portion of the fondant layer with a chocolate coating and solidifying the chocolate coating to form a support hull.

In another aspect, mold systems are provided for forming an edible composition having an inner portion and an outer portion. The mold system includes a first mold portion comprising a dimensional feature formed in a wall of the first mold portion, the first mold portion having a periphery and at least one aperture through the wall and a second mold portion having a periphery, the second mold portion being alignable to the first mold portion so that the periphery of the first mold portion aligns with the periphery of the second mold portion and an interior space is formed between the first mold portion and the second mold portion. The mold system further includes a fill opening formed in an upper portion of the mold system and connected to the interior space, an opening formed in a bottom portion of the mold system and connected to the interior space; and a base plate connected to the bottom portion for sealably connecting the first mold portion and the second mold portion to the base plate.

BRIEF DESCRIPTION OF THE DRAWINGS

FIG. 1 represents a cross-sectional, thru elevation side view of an embodiment of a mold system taken at 1-1 of FIG. 2A.

FIG. 2A illustrates a top view of the mold system shown in FIG. 1.

FIG. 2B illustrates an enlarged view of a portion of FIG. 2A showing an embodiment of a flange connection.

FIG. 2D is an enlarged sectional view of an embodiment depicting a composite covering.

FIG. 2E is an enlarged sectional view of an embodiment depicting a composite covering.

FIG. 3E is a side view illustrating an embodiment of a 3-D cake showing support of the 3-D cake having a base surface that is only about 20-30% of the horizontal mass of the cake.

FIG. 3F depicts a top view of the cake shown in FIG. 3E showing a base support surface area relative to a horizontal mass of the cake.

FIG. 4 is a front view of an embodiment of a cake made with the mold system depicting added accoutrements applied to the cake.

FIG. 5 illustrates an embodiment of an inner portion securement device.

FIG. 6 illustrates an embodiment of the edible composition system secured to a plate.

FIG. 7A is a cross sectional view taken at 7-7 of FIG. 6.

FIG. 7B is an enlarged cross sectional view showing an alternative recess application.

FIG. 8 is a cross sectional view taken at 7-7 FIG. 6 showing embodiment having an alternative stabilizing device.

FIG. 9 illustrates an embodiment of a securement device.

FIG. 10A illustrates a partial perspective view of the securement device shown in FIG. 9 partially inserted into the inner portion of the edible composition.

FIG. 10B illustrates an embodiment showing slots in the fill spout at a different position than shown in FIG. 10A.

FIGS. 17A and 17B illustrate an embodiment of a pan for forming an inner portion of an edible composition.

DETAILED DESCRIPTION

Figure 2C:
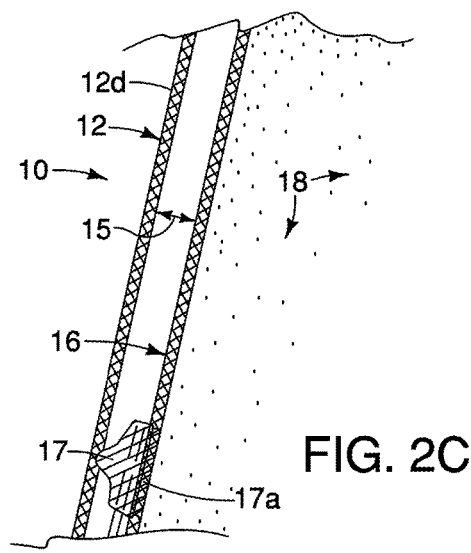
FIG. 2C is an enlarged sectional view taken at 2-2 of FIG. 1.

The embodiments disclosed below are not intended to be exhaustive or to limit the scope of the disclosure to the precise form in the following description. Rather, the embodiments are chosen and described as examples so that others skilled in the art may utilize its teachings.

Embodiments disclosed herein relate to mold systems for edible compositions and methods of preparing edible compositions using the mold systems. The edible compositions include, but are not limited, cakes, including 3-D cakes, and other dessert items. The edible compositions include at least one inner portion and at least one outer portion. The inner portion may be a cake, brownie, bread, muffin, frozen desserts, baked and set Puddings, baked custard desserts and combinations thereof. Non-limiting examples of frozen desserts include ice cream, yoghurt, mousse, and gelato. Non-limiting examples of baked and set puddings include Pudim Abade de Priscos, Bánh chuối, banana bread, Bebinca, Bread and butter pudding, Clootie dumpling, Espasol, Figgy pudding, Haupia, Sticky date pudding, and Kulolo. Non-limiting examples of baked custard desserts include Berliner, Bienenstich, Cheesecake, Clafoutis, Cremeschnitte, Far Breton, Flourless chocolate cake, Ozark pudding, Miguelitos, Quindim, Salzburger Nockerl, Semifreddo, Soufflé, and Tipsy cake. The outer portion may be chocolate, fondant, icing, frosting, candy and combinations thereof. In some embodiments, the edible composition includes sculpted recesses and/or cantilevers, details and features that are crafted into a desired shape. In some embodiments, the edible compositions may be in shapes such as people, animals and/or other dimensional objects created from imagination, and in some embodiments, the majority of the surface area of the object as found in nature is free from contact with a base surface.

As used herein, the term "cantilever" may be used interchangeably with the terms "protrusion" and "projection" and refers to any rigid or semi rigid structural member projecting from a generally vertical support, especially one in which the projection is greater in its length in relation to the width so that the upper part of the connection of the projection is in tension and the lower part is in compression.

3-D Cake Prescriptive Chocolate Structure Forming Mold Aspects

TYPE I—Vertical Only (Single Mold Portion)
Includes cakes having a base support, where the surface contact area is generally similar in size to the opposite decorative features on the surface of the cake. An example of Type I cakes includes a typical flat-back birthday cake.

TYPE II—Bi-Directional (Two Mold Portions)
Includes cakes having a base support, where the surface contact area of the base is smaller in size than the surface of the cake having the decorative features and where the base is generally positioned as a right angle to the decorative features including projections and cantilevers. An example would be a decorative cake shaped as a bear sitting down having a bi-sectional vertical parting line relative to each mold half positioned at cake's common widest points, i.e. no opposing wraps, returns or undercuts.

TYPE III—Tri-Directional (Two or More Mold Portions)
Includes cakes having a similar base support as described for Type II but having increased vertical dimensional features relative to the horizontal plane of the decorative cake. An example, also a bear, but in this embodiment the bear is standing up also having a bi-sectional parting line relative to each mold half but also has an inner mold relative to each outer mold, i.e. forming structurally stable opposing wraps, returns and or undercuts such as leg, arm and breast dimensional features.

TYPE IV—Omnidirectional (Three or More Mold Portions)
Includes cakes having similar base support as described for Types II and III but having increased horizontal dimensional features relative to the vertical plane of the decorative cake. An example is also a bear positioned 'balled up' on its back (see FIG. 3E) where the cantilevered portions bisect at the widest points of the decorative cake relative to a horizontal parting line in which two or more mold portions are mated together and also having at least one/mold-insert also to form structural stable appendages as previously described.

As described herein a mold system and methods are provided for rigidifying an edible composition such as a cake by encapsulating at least a portion of the edible composition within an exoskeleton. The edible composition may generally have a shape where the height of the edible composition is at least as great as its width and/or an upper portion is larger than its base, and/or the edible composition includes protruding cantilevered features. In some embodiments, the exoskeleton is provided as a chocolate hull.

In some embodiments, a mold system and a method to support an edible composition may include an exoskeleton and/or an endoskeleton. An exoskeleton may be provided as a chocolate layer that may include integral walls over the outer surface of an inner portion such as cake and may further include beams (endoskeleton) as part of the chocolate molding process. A framework may be included to resist longitudinal compression to not only stabilize the edible composition but also resist force-loads applied during cutting and serving of the edible composition.

In other embodiments, a dimensional cake having a mass wider than a height but still requiring support to add rigidity may be formed by creating mostly vertical channels to receive the liquefied chocolate that upon solidifying resist compression forces acting upon the cake.

In other embodiments, a mold system and a method to support a cake's decorative outer surface such as rolled fondant over a decorative cake utilizing frosting as substrate between the cake, the chocolate hull and optionally the fondant are provided.

In yet another embodiment, a mold system and a method utilizing a vacuum forming process to form a fondant-chocolate type edible hull are provided.

In addition to conventional 3-D baked cakes as previously mentioned other dessert items, like ice cream cakes having masses greater than their height, cantilevers and even decorative features including 3-D figures are now possible utilizing a mold-hull process that provides a never before contemplated edible support hull as a composited insulator.

In some embodiments, a method and a mold system are provided to add cantilever design features not possible with conventional icing or frosting.

In yet other embodiments, a method and a mold system are provided to distribute a shapeable, upon solidifying, liquefied covering, directly to an edible composition. In some embodiments, the liquefied covering may be chocolate.

In some embodiments, a method and a mold system provide structural support to a cake having an upper portion larger than a base portion of the edible composition are provided.

In some embodiments, a method and a system to add a covering that replicates 'artist handed' sculpted shapes and detailing of 3-D custom cakes and other dessert or food items are provided.

In some embodiments, a method and a mold system are provided to form a composite fondant and chocolate shell as an outer portion of the edible composition. The method and the mold system may be used for securing an exterior surface veneer, preferably rolled fondant utilizing a liquefied chocolate to form the outer portion.

In yet other embodiments, a method and a mold system to provide structural support for a cake and an outer surface covering such as fondant, for example, with chocolate as the support, where the formative chocolate hull is in contact with both the cake and fondant are provided.

Another embodiment provides structural support for a cake, a sub-covering such as frosting and a surface outer covering such as chocolate or fondant.

Another embodiment provides a method and a mold system to vacuum form fondant.

Some embodiments provide a method and a system to produce decorative 3-D ice cream cakes that are structurally sound resisting compression forces.

Still other embodiments are directed to a method and apparatus to minimize the process (steps) and skill level (home baker to professionals) to produce decorative 3-D cakes in an easy, cost effective process.

Embodiments described herein may be used to increase a refrigerated cake's shelf life from approximately 24 days up to 4-6 weeks.

FIGS. 1 and 4 are shown to represent an embodiment of a mold system 10 primarily comprised to illustrate a caricature type example of an edible composition shown as a 3-D bust of our 'Uncle Ronnie'.

FIG. 1 depicts a cross-sectional view taken at line 1-1 of FIG. 2. The mold system 10 includes a first mold portion 12 and a second mold portion 14. The first mold portion 12 and the second mold portion 14 may have similar shapes or may have different shapes relative to each other. The first mold portion 12 and the second mold portion 14 may include recessed portions and/or protruding portions to reproduce dimensional objects having multiple shapes and relief details. The first and second mold portions 12, 14 may each include a mating type integral flange 12a, 14a, shown in phantom in FIG. 1, that extend around at least a portion of first and second mold portions 12, 14. In some embodiments, the flanges 12a, 14 extend to a top 34 of the mold system 10 and at least partially along each side 36. In some embodiments, the first mold portion 12 and the second mold portion 14 may have different shapes corresponding to different features of the final product where the first and second mold portions 12, 14 are shaped so that mold portions 12, 14 connect together at the flanges 12a, 14a. In other embodiments, the first mold portion 12 and the second mold portion 14 may be mirror images that connect together at the flanges 12a, 14a. The mold system 10 may also include flange portions 12b, 14b that are molded into a shape creating a 'fill spout' when mated together. The flange portions 12b, 14b may be positioned at the top portion 34 of the mold system 10 and in some embodiments, the flange portion may be positioned at multiple positions on the mold system 10, for example on the sides, from and/or back of the mold system 10. In some embodiments it may be preferable to have mating flanges 12a, 14a around the entire periphery of both first and second mold portions 12, 14.

In some embodiments, an opening 38 may be formed at a bottom portion 39 of the mold system 10. The flanges 12a, 14a may include a mechanism for indexing to insure proper mating of the first and second mold portions 12, 14. In some embodiments, the first and second mold portions 12, 14 and upon indexing may be temporarily secured to each other utilizing known techniques such as a snap-fit connection with mating protrusions and recesses, clips, post binders, magnets, or Velcro applications. In some embodiments, additional flange portions 12c, 14c may also be included (shown in phantom). The mold system 10 is configured to be used with an edible composition inner portion 18 that may be positioned within the first and second mold portions 12, 14. The mold system 10 may further include a plurality of apertures 12d, 14d that may be used as air release apertures or for vacuum application to facilitate the complete filling of a mold cavity 15 that extends around a periphery of the edible composition inner portion 18 when the inner portion is positioned within the first and second mold portions 12, 14. By way of non-limiting example, the edible composition inner portion 18 may be cake.

FIG. 1 also shows an example of a detail portion 20 of the mold system 10. The detail portion 20 represents a typical cantilever portion that may be included with the mold system 10. FIGS. 1 and 2A show an example where the detail portion 20 is a nose. The detail portion 20 may include other cantilevers/protrusions such as ears, eye brows, lips and other detailing are also possible in creating sculpted detailing including recesses such as an inside of a mouth for example as described in more detail below. In some embodiments, the detail portion 20 may include a head, arms and/or legs when a portion of the body is connected to a base as described below and an example is shown in FIGS. 3E and 3F. The detail portion 20 may be any type of protrusion included with the mold system 10. The first mold portion 12, the second mold portion 14 or both the first and second mold portions 12, 14 may include detail portions 20.

In some embodiments, an edible composition first outer portion 16 may be added to the inner portion 18. In some embodiments, the first outer portion 16 may be liquefied chocolate as the formative structure. Methods of using the mold system 10 to add the first outer portion 16 to the inner portion 18 are described below. The first outer portion 16 is shown surrounding a periphery of the inner portion 18 in FIG. 1. FIGS. 2C-2E illustrate an enlarged sectional of view the first outer portion 16 within the mold cavity 15 and surrounding the inner portion 18.

FIG. 2A is a top view of the mold system 10 shown in FIG. 1, showing the first and second mold portions 12, 14 with the integral flanges 12a, 14a, the cantilever 20 and relief detailing 22. The plurality of plurality apertures 12d, 14d near the top portion 34 are also shown.

FIG. 2B illustrates an enlarged portion of an embodiment showing the connection of the flanges 12a, 14a. FIG. 2B depicts an embodiment including rolled fondant 19 that is mated to itself as part the molding process. The first and second mold portions 12, 14 each have protruding the flanges 12a, 14a for securing the first and second mold portions 12, 14 together during the filling process of first outer portion 16 of the edible composition. A temporary securement clip 25 is shown in phantom for reference. The flanges 12a, 14a each may include a recess 12e, 14e designed to receive fondant 19 prior to assembling the first and second mold portions 12, 14. During the assembly process of the first and second mold portions 12, 14, fondant 19 is 'squeezed' together creating a solid joint area 19b that bond together from the clamp force or other connection securing the first and second mold portions 12, 14 together. The fondant 19 may further be fused together by the first outer portion 16, for example chocolate, upon solidifying of the first outer portion 16 so that the chocolate first outer portion 16 bonds to the fondant 19 creating a strong joint easily trimmed after demolding.

Figure 2F:
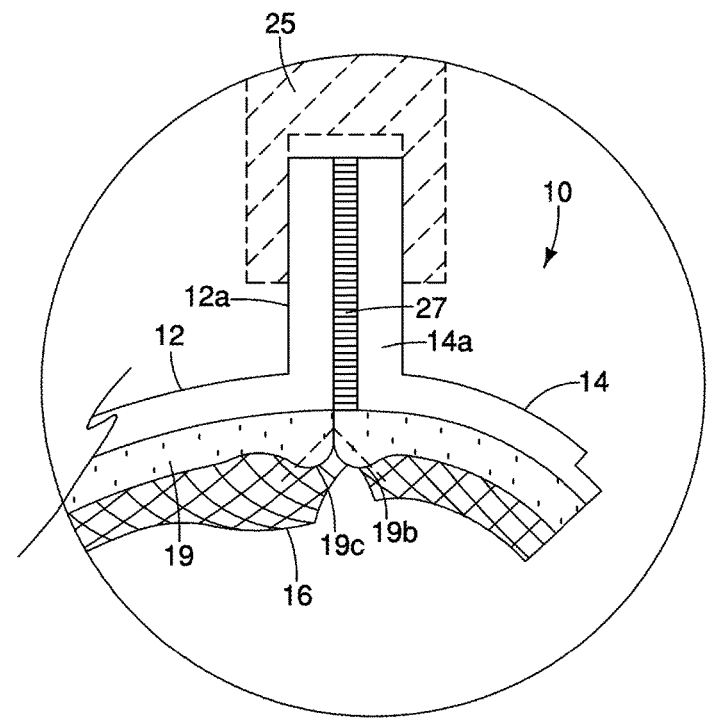
FIG. 2F illustrates an enlarged view of a portion of FIG. 2A showing an embodiment of a flange connection.

FIG. 2F illustrates an enlarged portion from FIG. 2A of another embodiment showing the connection of the flanges 12a, 14a. A clip 25 is shown in phantom and may be used to secure the flanges 12a, 14a together. FIG. 2F depicts an embodiment including fondant 19 that is mated to itself as part the molding process and also to the outer portion 16. In this embodiment, a gasket material 27 may be integral to one or both of the first and second mold portions 12, 14 of the mold 10. The gasket 27 has a shore value and thickness relative to compression force of the fondant butt-joint 19b and clamp force to resist the mold separation due to hydrostatic pressure created during the introduction of the liquefied outer portion 16, for example liquefied chocolate. In some embodiments, one or sometimes two thin layers 19c of fondant can placed between the gasket 12c and the flanges 12a, 14a to help fill any gaps due to 'puckering' of the joint that may occur after clamping.

A sectional view taken at line 2-2 of FIG. 1 is shown in FIGS. 2C-2E illustrating the mold cavity 15. A baking pan-form mold 11 (shown in FIGS. 17A and 17B) is used to create the inner portion 18 (substrate), preferably cake, generally of a shape similar to the first and/or second mold portions 12, 14 and having less in mass than the final contour of the first mold portion 12. The pan-form mold 11 is shown in FIG. 2C to demonstrate the size of the pan-form mold 11 relative the first and second mold portions 12, 14. The pan-form mold 11 is described below in more detail.

The mold cavity 15 is the difference in the size of between the first and second mold portions 12, 14 and the inner portion 18. Examples of the cavity 15 are shown in the enlarged FIGS. 2C-2E. One or more spacers 17 may be positioned between the mold portions 12, 14 and the inner portion 18, for example as shown in FIGS. 2C and 2D using the first mold portion 12. Similarly, one or more spacers 17 may be positioned between the second mold cavity 14 and the inner portion 18 of the edible composition. In some embodiments, the spacers 17 may be secured to the inner portion 18 using an edible substance 17a to secure the spacers 17. By way of non-limiting example, the spacers 17 may be chocolate, such as solid chocolate, including melting wafers and the securing edible substance 17a may be icing, frosting or a similar substance.

In some embodiments, the first outer layer 16 may fill the entire mold cavity 15 as shown in FIG. 2C. In still yet another embodiment, it may be desirable to use a thinner first outer portion 16 so a layer of an additional substance 13 (shown in phantom in FIG. 2D) may fill a portion of the mold cavity 15. In some embodiments, the additional substance 13 may be melted down hard candy as the formative structure.

FIG. 2E represents an embodiment of the mold system 10 to create a 3-D object covered in both the first outer layer 16 and a second outer layer 19. In some embodiments, the first outer layer 16 may be chocolate and the second outer layer 19 may be fondant that may be layered over the inner portion 18. Together, the first outer layer 16 and the second outer layer 19 fill the cavity 15. In some embodiments, the inner portion 18 may be covered in frosting and the first outer layer 16 may be added over the frosting.

Figure 14:
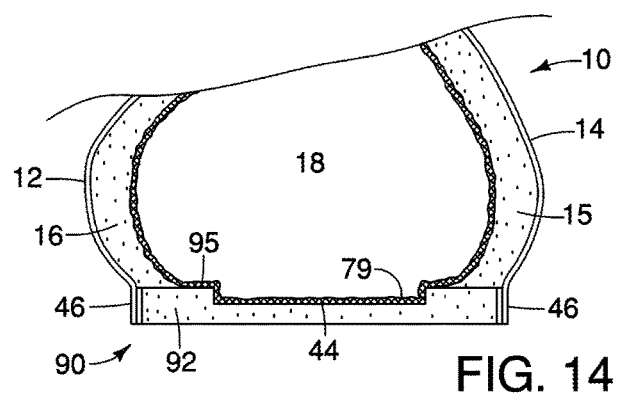
FIG. 14 illustrates a sectional view of the riser shown in FIG. 13 together with the mold system.

FIGS. 13-16 illustrate an embodiment of an alignment system 90. The alignment system 90 may be used with the spacers 17 or as an alternative to the spacers 17. As shown in FIG. 14, the mold system 10 may include the first and second mold portions 12, 14 and a riser tray 92. The inner portion 18 and the outer layer (hull) 16 are also shown in FIG. 14. The primary purpose of the riser tray 92 is to ensure that the inner portion 18 is centered and that the inner portion 18 resists horizontal movement due to the hydrostatic pressures that could result from uneven distribution of the flowable food product of the outer portion 16.

Figure 13:
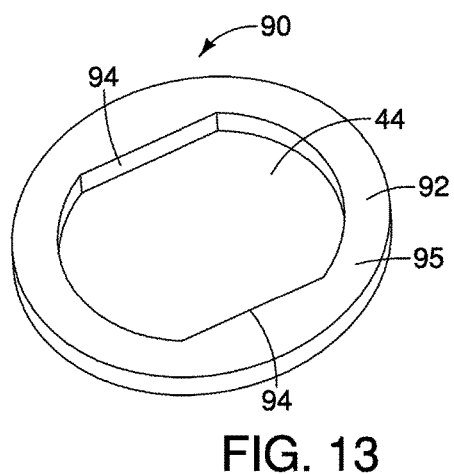
FIG. 13 illustrates a top perspective view of a riser that may be included in the mold system.

FIG. 13 represents a top perspective view of the riser alignment tray 92. A recess portion 44 is provided to correspond to a protrusion 79 of the inner portion 18 (shown in FIG. 14) to insure and secure correct positioning of the inner portion within the mold portions 12, 14. In some embodiments, the overall shape of the riser 92 may be oblong to facilitate placement of the first and second mold portions 12, 14 relative to the riser 92. In some embodiments, the riser may have a height of approximately ½". As shown in FIG. 13, the recess portion 44 may have generally oblong shape with two parallel walls 94. Because the riser 92 has an oblong shape and having the walls 94 perpendicular to one another both the inner portion 18 and first and second mold portions 12, 14 will only mate together in the correct manner. i.e., always front to back and side to side. The riser 92 may include a flat shelf portion 95 supports the inner portion 18 also having a vertical portion 97.

Figure 16:
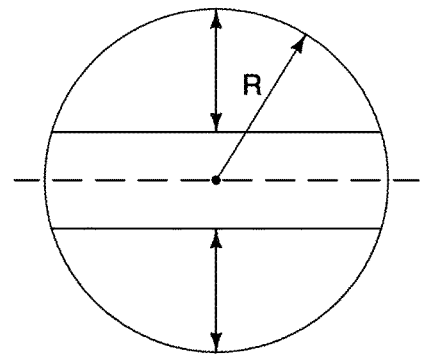
FIG. 16 illustrates the centering features of the riser and the mold system.
Figure 15:
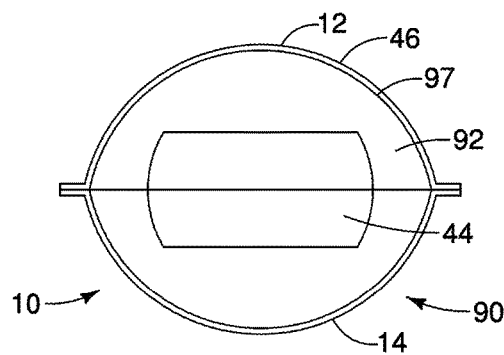
FIG. 15 is a top view of the riser and the mold system shown in FIG. 14.

FIGS. 14 and 15 illustrate the mold system 10 utilizing the riser 92. In some embodiments, the riser 92 may be first formed by pouring and solidifying chocolate then demolded. The riser 92 may be placed on a serving plate (not shown). The inner portion 18 having the protrusion 79 which corresponds with recess 44 of the riser 92 is positioned within the recess 44 as shown in FIG. 14. In some embodiments, it may be preferable to first add icing to the recess 44 to help secure the inner portion 18. After the inner portion 18 is aligned properly to riser 92 the first mold 12 is positioned adjacent to riser 92. The first and second mold portion 12, 14 each have vertical flange portions 46, and are also oblong along their bottom periphery corresponding to and along the same parallel axis and riser 92. The second mold portion 14 is aligned and mated to both the first mold portion 12 and riser 92, fastened together with appropriate fasteners. The cavity 15 may then be filled with the flowable outer portion 16. FIG. 16 illustrates the centering features of the riser 92 and the first and second mold portions 12, 14.

As described above and shown in FIG. 1 and FIG. 2A, it may sometimes be preferable to include the plurality of apertures 12d, 14d to release any trapped air accumulated during the filling to facilitate complete filling of space 15. The plurality of apertures 12d, 14d may be used for passive air release or in conjunction with a vacuum source (described in more detail below). In some embodiments, the plurality of apertures 12d, 14d may be positioned near the top portion 34 of the mold system 10. In some embodiments one or more apertures 12d, 14d may be included on the detail feature 20 and/or over a portion of the first and second mold portions 12, 14. Some or all of the plurality of plurality air release apertures 12d, 14d may sometimes be temporarily plugged until the first outer portion 16 is hardened.

In some other embodiments, especially for finer detailing, it may be desirable to brush on a light coat of the outer portion to an inner face of the first and/or second mold portions 12, 14 prior to assembly and filling.

In some embodiments, it may be preferable to apply the fondant 19, sometimes even different colors of fondant 19 only to certain features such as eyes, lips or other portions of the mold portions 12, 14 details then fill the balance of the cavity 15 with a liquefied chocolate 16 over cake form 18. In some embodiments, the interior face of the mold portions 12, 14 may covered with a layer of pliable, rolled fondant 19 that is pressed into or over the interior face of the mold portions 12, 14. In other embodiments, the second outer layer 19, for example fondant, may be positioned in the interior face of the mold portions 12, 14 using a vacuum as described with reference to FIG. 3C.

Figure 3A:
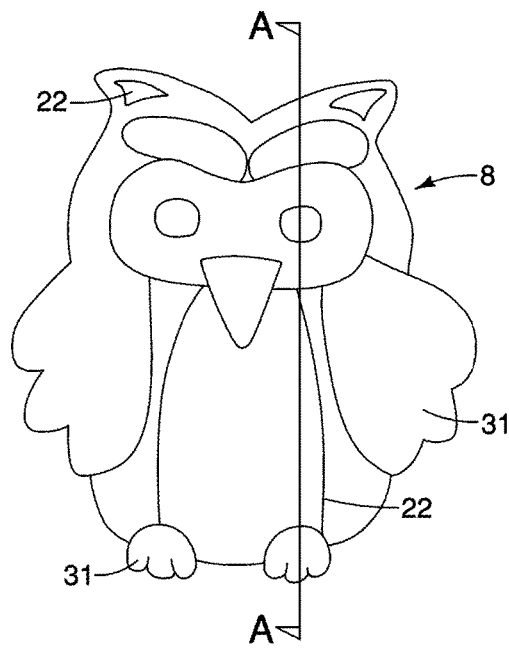
FIG. 3A is a top view of a decorative shaped cake.

FIG. 3A illustrates a top view of a finished flat back decorative fondant covered shaped cake 8 with sculpted detailing having relief details 22 and may further include adornments 31 as appliques. The outward appearance of the finished cake 8 may be similar whether the cake 8 is constructed using known methods or the new methods described herein.

Figure 3B:
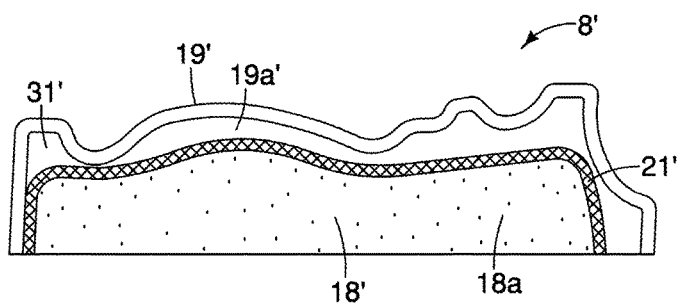
FIG. 3B is a cross sectional view taken at A-A FIG. 3A of a prior art fondant covered shaped cake.

FIG. 3B represents a cross sectional view taken along line A-A of FIG. 3A of a typically constructed prior art application for the cake 8' including a 'carved' cake mass 18', a thin layer of frosting 21' for crumb coating the cake mass 18', a shaped fondant substrate 1918a' and fondant cover 19'. Typically a prior art sculpted flat cake 8' is constructed by stacking multiple cake mass 18' layers into a large block 18a', freezing the block 1818a' and then carving the block 1818a' into the rough shape of the desired finished cake 8'. After rough shaping of the block 1818a', a thin crumb coat of frosting 21' is applied over the cake block 1818a' to adhere the fondant substrate 1918a'. To create protrusions such as the adornments 31', a mass of fondant 1918a' must first be shaped and applied at each design detail including recesses like the inside of mouth, ears, etc. After the fondant masses 1918a' are secured they are dampened to receive the final fondant cover 19'. Upon layering the fondant cover 19' over the fondant masses 19', two issues typically exist; one, trying to push, without tearing, the fondant cover 19' into and over the soft cake frosting 21' and fondant build-up masses 19', and two, creating and eliminating trapped air between the fondant cover 19' and the fondant masses 19' and/or the frosting 21' and/or the cake mass 18'. If not installed securely, the fondant cover 19' will either bulge (trap air) or sag (from release of trapped air) and invariably, negatively affect the final product 8'.

Figure 3C:
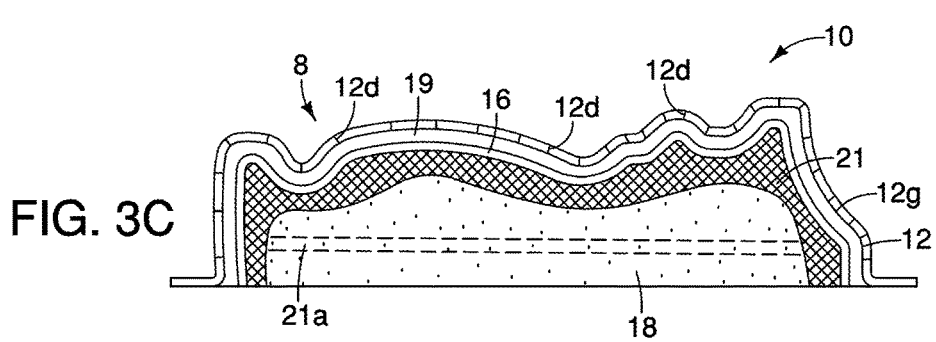
FIG. 3C is a cross sectional view taken at A-A FIG. 3A a fondant covered shaped cake made with an embodiment of a mold system described herein.

The methods and mold systems 10 described herein may be used to overcome the problems with the prior art methods for creating a finished decorative edible composition 8, for example as described with reference to FIG. 3B. FIG. 3C also represents the cross sectional view taken at line A-A of FIG. 3A but now depicting the edible composition 8 formed using the new methods and mold systems 10 described herein. The first mold portion 12 is included in FIG. 3C for reference. In this embodiment, the fondant 19 may be positioned within the first mold portion 12 using the plurality of openings 12d to temporarily secure the rolled fondant 19 to an interior surface 12g of the first mold portion 12. Previously, for example in the prior art cake 8', the only way to get dimensional and relief detailing was to pre-shape the fondant or gum paste and then attach or apply the covering thick enough to carve desired shape or details which is very time consuming and requires a great amount of skill level. As shown, the cake 8 includes inner portion 18, frosting 21, the outer portion 16, the fondant cover 19 shown in the vented mold portion 12. Previously, the embodiment shown in FIG. 3C was not possible due to cake having little compression resistance and frosting having almost none as limited to its own weight/thickness ratio.

FIG. 3C illustrates that the first mold portion 12 is of a desired shape and detailing similar to the cake 8' with the time consuming and expensive similar/previously described sculpted and shaped cakes described in FIG. 3B. The mold portion 12 includes multiple apertures 12d for evacuation of entrapped air between the inner surface of the mold portion 12 and fondant 19 corresponding to the outer surface of the finished cake 8. The apertures 12d are of a quantity, space and location providing two distinct functions after the vacuum source is applied (1) guarantee mating of fondant 19 to the mold portion 12, and (2) remove all air therefore eliminating the prior art issue of trapping air creating problematic bubbles when laying of a fondant sheet over a shaped substrate such as other fondant, frosting, etc. The frosting 21 can be utilized in a typical thickness if desired for additional taste due to the strength of the first outer portion 16, for example a chocolate hull, or in some embodiments, the frosting 21 may not used at all so that the outer portion 16 would directly contact both to the fondant 19 and the cake 18. In some embodiments, the cake core 18 can have one or more layers with frosting 21a (shown in phantom) between the layers. In other embodiments, a thin layer of frosting is spread across the cake's bottom (not shown). In other embodiments as a means for additional strength, a layer of chocolate 16a may be included across the bottom of the inner portion 18 (shown in FIG. 3E extending partially across the bottom).

In other embodiments, depending on the thickness of the fondant 19 and the detail of the mold portion 12, a pressure form to apply a positive air pressure can be utilized. In some instances, the positive air pressure application can be enough to ensure complete mating of fondant 19 to the inner surface 12g of the mold portion 12. In other instances, the positive air pressure may be used in combination with a vacuum source (negative air pressure).

Figure 3D:
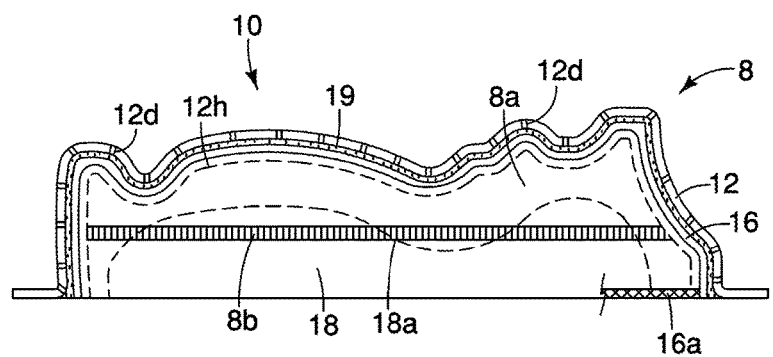
FIG. 3D is a cross sectional view taken at A-A FIG. 3A showing a fondant covered ice cream cake made with an embodiment of the mold system.

FIG. 3D illustrates a sectional view taken along line A-A of FIG. 3A of yet another embodiment of the mold system 10 used to produce decorative, structurally sound 3-D ice cream cakes. Decorative 3-D ice cream cake 8 includes the shaped fondant covering 19, the chocolate hull 16, at least one or more layers of ice cream 8a, filling 8b and optionally the cake core 18 delineated with phantom line 18a. For reference plug mold 12h is shown in phantom. The mold plug 12h may be sized and shape to fit into the mold 12 and may be used to create a space to equally distribute the outer portion 16 against the fondant 19 or against the mold 12. The mold plug 12h may be used to facilitate spreading the outer layer instead of spreading by hand or roto-casting. In some embodiments, the mold plug 12h may be used to form the outer portion 16 into a shell, for example, to be used with an ice cream cake. Also shown for reference, in partial, is a cap/base 16a that may be used in some embodiments. The cap/base 16a may be used to add structural support and/or to seal the inner portion 18. In some embodiments, the base 16a may extend across the entire base of the inner portion 18 and in other embodiments, the base 16a may extend partially across the base of the inner portion 18.

Figure 3G:
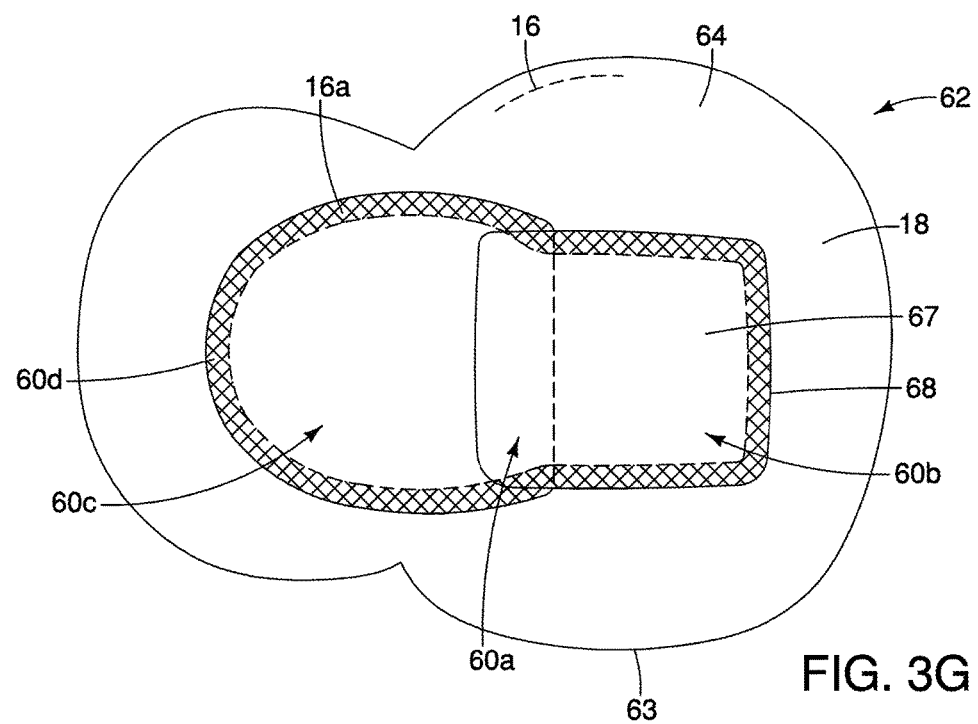
FIG. 3G depicts a bottom view of the cake shown in FIG. 3E.

FIGS. 3E, 3F & 3G represent an example of a formative structural cake system. FIG. 3E demonstrates a side view of an edible composition 62 made using the methods and the mold system 10 showing that outer portion 16 forms the support system thereby eliminating the non-edible support systems typically required to achieve the similar life-like gravity-defying dimensional cakes as previously described. In FIG. 3E, the edible composition 62 is shown as a bear 61 including multiple features 20, such as protruding legs with feet, arms, nose, etc. for the purpose of illustrating the method and the mold system 10 unique ability in providing a means to add structurability in producing a 3-D cake having a cantilevered portion 63 that is approximately 80% of the mass of the edible composition 62 as compared to a support surface 67 having a contact area that is around 20% of edible composition 62. Delta 60 represent the primary stress/fulcrum points and are therefore utilized for stress-load calculations. For example, in practice Delta 60 stress points are continuous around a periphery 68 of the surface/contact area 67 and having a circumference of approximately 28% that of the total periphery of outer portion 16, relative to the cantilevered 63 downward force 64. A force 64 (weight) and a moment arm 66 (cantilever) are shown in FIG. 3E to illustrate one of at least four stress areas 60a-60d (four sides) relative to the periphery 68 of the support surface 67.

Turning now to FIG. 3F which is a top view of FIG. 3E showing cross sectional lines A-A and B-B as means to perform a structural analysis of the cake 62. The cake 62 may be described (in engineering terms and calculating) as a column (vertical mass) at which a lateral load (projections/cantilevers) is applied. This load is comprised of the weight of the cake, the frosting (if applicable), the fondant (if applicable), decorations and the outer portion 16. The weight of all the components of the cake must be resisted by transferring harmful concentrated loading away from the main stress area 60a. For representation purposes, but not limited thereto, the bear 61 is shown positioned on its back to create for example near maximum stress associated between the surface contact area 67 and force (gravity) 64 resultant from weighted cantilevered area 63—sections A-A and B-B to best perform the structural analysis. For example—stress area of wt. (width×length), the crossed part of B-B section (width) and crossed section A-A (length) would be used to determine the load that creates the stress. It must be noted that in the example described, though the most critical (most mass-force), the balance of the peripheral cantilevered loading 63 of the edible composition 62 must also be taken into account; notably the curvature lateral forces as related to the outer portion 16 having a directional change along a horizontal plane. The load resistance must be established by the design strength of the outer portion 16 (hull) load applicable thickness at areas 60b, 60c relative to stress points along 60a of the cake 62 mass in response to moment arm 66 shown in FIG. 3E; i.e. The fiber stress formula: sf=moment/section modulus. This can be written: sf=weight×moment arm/wf$^2$/6. Result is expressed in ounces/square inch. The outer portion 16 properly designed to be utilized to support a decorative cake 62 can empirically be achieved by using the strength of chocolate or other suitable food product and or material (non-food) each having an appropriate strength to weight ratio (STWR) capable of resisting moment forces as previously described.

The method to create a structurally sound 3-D cake as described in FIGS. 3E-G (after determining appropriate hull 16 thickness) begins by preparing the inner portion 18 of the edible composition 62 as described herein. The next step is utilizing the mold system 10 which in this embodiment includes at least one lower portion "A" which in this embodiment is a single part mold, a mid portion "B" being of at least a double parted mold for ease of removal from cake 62 under cut areas 69 and upper portion "C" that may be a conventional single part mold. The mold sets A,B,C may each have corresponding connectors for connecting the mold sets to each other. In other embodiments, fewer or greater mold portions may be used to make the edible composition 62. The mold portion "C" may include an integral funnel portion 70 which is utilized for adding the flowable outer portion 16. The funnel 70 may be used as a means for a final filling process depending upon access to and type of equipment that is available, for example for melting chocolate when chocolate is used as the outer portion 16. For instance, in commercial applications a constant flow depositer with vibrating table could be used. The supports 60b and 60c may be poured and followed by a final application using the funnel 70. For a small bakery or even residential use, the filling process could be first the base and then multi pours comprised of at least one per mold set. Beginning with A, then B & lastly C. In some embodiments and as previously described in FIG. 1, air release apertures 71 are sometimes included to facilitate the complete filling of the mold cavity 15. The preferred mold material for fabrication is PETG, preferably clear or translucent to visually aid in the distribution of the flowable outer portion 16. In addition to PETG, other mold materials such as silicone may also be used. For example, molds made of silicone, or mother molds lined with silicone can also be used. The flexible nature of the silicone, though having an increased mold cost, allows for mold system 10 to have less portions than semi-rigid mold systems. In some embodiments pending the design shape, protrusion and undercuts, a mold system 10 could include both semi-rigid plastic and silicone manufactured molds. The preferred material for mold portion "B" is food safe epoxy resin per CFR Title 21, Part 175.300 and 175,105, preferably clear or highly translucent.

In continuing the process, mold portion "A" is first placed on a suitable work surface in a leveled position. The first of consecutive pours of the outer portion/hull 16 is foundation 60b (FIGS. 3E & 3G) which is filled to an appropriate level and thickness per calculations as previously detailed. Upon solidification, the mold portion "A" is repositioned so that the cantilevered portion 63 having the most mass to a level approximately 60° from level plane of foundation 60b previously poured and now solidified. The repositioning-leveling of mold "A" can be performed utilizing a slant-rack that in general conforms to mold "A" exterior surface contours as appropriate (commercial use) or mold "A" can be temporarily blocked up by any appropriate known means such as leveling shims, formed foil rolls and in some embodiments formed clay, even a combination of the above could be utilized. After mold "A" is re-leveled to the proper degree and secured, the support portion 60c is poured per required thickness/depth as previously calculated. Upon solidification the support 60c will have adhered to the foundation 60b by fusing itself to the foundation 60b while still in the molten stage.

After solidification of the support 60c, the mold "A" is returned to its original 'level' position. The mold "A" is now ready to receive previously prepared inner portion 18 having a bottom portion generally shaped to correspond to top-surface portions of foundation 60b and support 60c. In addition, inner portion 18 includes an exterior surface 18a that is contoured to correspond to the interior face of mold system 10 and of a mass and size less than mold system 10 to create a cavity 15 to receive the outer portion 16 to form the support hull as previously described throughout this application. In some embodiments and as also previously described it may be preferable to add one or more layers of icing such as a very light layer for securement between inner portion 18 and the foundation 60b and the support 60c. In addition to or just by itself, icing can be used to 'glue' inner portion 18 together for multiple sections when more than one cake baking pan is utilized also as previously described, or added to enhance the taste of the edible composition 62. After placement and securement of inner portion 18 it may be preferable to pour the liquefied outer portion 16 to just under top portion of mold "A". Again it should be noted that the contact areas of new outer portions 16 forming the hull will always adhere to previous poured outer portions 16 so multi layered pours are acceptable and in some instances recommended. The next step is placing the corresponding mold "B" as previously described onto an upper portion of the mold "A" and securing together utilizing appropriate fasteners such as plastic thru bolts, clips, clamps or even 'swell latches'. Once mold "B" is connected to the mold "A", again as previously described, the level of the outer portion 16 may be adjusted until the level of the outer portion 16 is just below mold "B" top.

The final application of mold system 10 is the placement and securement of the mold "C" upon or into the mold "B" and securing together as previously described. Utilizing the integral mold funnel 70, also previously described, the balance of the outer portion 16 while in a liquefied stage is poured into the mold "C" completing the mold process structural formative cake system in producing edible composition 62. The edible composition 62 is now, upon solidification and optionally chilling is demolded and decorated as previously described. In some embodiments where shipping or general transport of finished products 62 is desired, a stabilizing plate (described below) can be incorporated into mold system 10 process.

FIG. 3G illustrates how the different support portions of the formative structural cake system correspond and work together to become a supportive hull 16 for a decorative 3-D cake. The support portion 60c mates to the foundation 60b through contact of liquefied outer portion 16 forming the support portion 60c with a solidified outer portion of the foundation 60c.

To provide integral support, 60c interfuses itself to foundation 60b upper portion, upon solidification a contact surface area is provided 60d for hull 16 which in application fuses/welds itself to supports 60b and 60c that is now integral to foundation 60b, when completed is now a formative structural hull 16 supporting an inner portion 64 preferably cake.

For reference, FIG. 3G gives a plan view of the main fusion points of the formative structural cake system. For example, the surface-overlay 60a of support 60c to foundation 60b is depicted. Also shown is the outer portion 16 surface-overlay contact area 16a corresponding to support systems 60a, 60b and 60c.

FIGS. 3C-3G illustrate the some of the advantages of the mold system 10 in solving some of the problems associated with prior methods of creating flat back fondant covered shaped cakes. For example, but not limited thereto, these embodiments demonstrate the mold system and methods described herein used to create a dimensionally stable fondant covered flat-back shaped/sculpted cake utilizing layered chocolate and sometimes frosting. Table Two further demonstrates the advantages of the mold system and methods over the prior art.

TABLE 2

ADVANTAGES OVER PRIOR ART

| ITEM/DESCRIPTION | PRESENT INVENTION | PRIOR ART |
|---|---|---|
| Thicker frosting for added taste expectations | Y | N |
| Eliminate Cake Build-ups | Y | N |
| Eliminate Fondant build-ups | Y | N |
| Eliminate Trapped Air Bubbles with fondant | Y | N |
| Production Time (after baking) | 3 minutes | 2 hours min. |
| Eliminate Softness issues final fondant covering | Y | N |
| Minimize Cake Waste (shaping) | Y | N |
| Positive locking of fondant to shape | Y | N |
| Stable fondant surface for decorating | Y | N |
| Consistent relief detailing | Y | N |
| Replace expensive fondant with cheaper cake | Y | N |
| Pleasant taste 'thin' fondant/chocolate composition | Y | N |

FIG. 4 illustrates a three-dimensional example of an edible composition in the form of a bust type caricature (of our Uncle Ronny) 30. FIG. 4 illustrates non-limiting examples of different type of objects on the finished composition that may be formed using the mold system 10 described above. Some of the objects may be formed separately and connected to composition after the mold system 10 has been released from the edible composition 8. For example, ears 31, bow-tie 32, and collar 33 are shown and may be produced by pouring a liquefied product into molds, letting product harden and then applying the objects to the edible composition 8 using standard attachment techniques. These objects may also be provided using pliable products like fondant and/or gum paste and then applying the objects to the edible composition 8 using standard attachment techniques. In some embodiments, these objects may be provided as features 20 in the mold system 10 as described above. For example, relief detailing 22 is produced by the outer portion 16 flowing into the mold cavity 15 or being pressed into the mold recesses or over mold protrusions as described above. Similarly, the ears 31, the bow-tie 32 and the collar 33 may be formed using the shape of the mold system 10 to create the features.

In some embodiments, the features may be added or enhanced by painting, either by brush and/or airbrushing to add realistic color and depth enhancements. Because the mold system 10 allows different mold textures such as a smooth or textured or other combinations of surface energies, realistic enhancements are now much easier to reproduce, requiring minimal skill level, and in a cost effective manner.

FIG. 5 illustrates a securement device 9 that may be used to secure the inner portion 18 within the mold system 10. The securement device 9 may be sized and shaped to fit within the fill spout formed by 12a, 12b shown in FIG. 1. The securement device 9 may be used resist lateral movement the inner portion 18 during the pouring process to insure the proper amount of final thickness.

In some embodiments, the securement device 9 includes a conical portion 40 preferably having a corresponding shape and/or dimension that is relative to the inside shape or dimension of the fill-spout as shown in FIG. 1 and as previously described. The portion 40 may be tapered to fit within the fill spout so that one or more prongs 41 of the securement device 9 can extend into the inner portion 18 and still leave an open area above the inner portion 18 and below the conical portion 40 so that the flowable outer portion 16 may be added through the fill spout with the securement device 9 inserted and flow into the cavity 15 of the mold system 10 shown in FIG. 1. The mold fill aperture or fill spout are generally located mostly centered and located at an upper most point on the mold system 10 to insure complete filling. The one or more prongs 41 may be pushed into the inner portion 18 to prevent uneven distribution of the outer portion 16 around the inner portion 18 to prevent uneven hydrostatic pressure forces acting upon the inner portion 18. In some embodiments, the securement device 9 may be used in conjunction with any of the mold systems and alignment devices described herein. For example, the securement device 9 may be used with the riser 92 described above or the base plate 42 described below. In other embodiments a plate with prongs or other type of projections may also be desirable to resist hydrostatic pressures at or near the bottom of the cake form.

FIG. 6 is a plan view of an embodiment in which the mold system 10 is used to form an integral inner portion 18 comprising cake 18, an outer portion 16 comprising a hull-covering and a base plate 42. For reference, a work surface 43 is shown. Also shown for reference are the first and second mold portions 12, 14, flanges 12a, 14a for temporarily connecting the first and second mold portions 12, 14. The base plate 42 also may include a vertical mold portion 49 and a recess 44 formed in the base plate 42. The recess 44 is sized and shaped to receive a portion of the inner portion 18 of the cake that protrudes from the base of the cake. In some embodiments, the base plate 42 may also include a ring structure 48 generally surrounding the recess 44. The ring structure 48 may correspond to the shape of the recess 44 and may be circular, oval, square or any other shape that corresponds to the recess 44. The shape of the recess 44 may be modified depending on the size and shape of the finished cake product 8. The ring structure 48 extends up from the base plate 42 as shown in FIG. 7A. In some embodiments, the ring structure 48 may include one or more open slots 45 so that the ring structure 48 may be discontinuous.

FIG. 7A represents a cross sectional view taken at through line 7-7 of FIG. 6. The inner portion cake core 18 includes a lower protrusion 79 that is of a shape and outer dimensions having a length, width and depth corresponding to the recess 44 of the base plate 42 so that the inner portion cake core 18 may be temporarily fixed to the base plate 42 in a generally central position to ensure even placement of the first outer layer 16 in the cavity 15. The recess 44 has a depth less than that of the total height of the ring structure 48 leaving a gap 47 between the bottom of recess 44 and the work surface 43. The open slots 45 of the ring structure 48 may be used to permit liquefied outer portion 16 to flow evenly and to fill the gap 47 and a space 16a. Upon solidifying of the outer portion 16, the base plate 42 may be secured to both the inner portion cake core 18 and the outer portion 16. In some embodiments in lieu of or in addition to the ring structure 48, a wall 48a which has an adverse angle to lock the base plate 42 to the outer portion 16 may be included, where the base plate 42 and the outer portion 16 are secured together after the outer portion 16 is solidified. To ensure that the correct size cavity 15 is provided between the inner portion 18 and the first and second mold portions 12, 14, an alignment flange 49 may be provided integral to the plate 42. The flange 49 has a height and shape correspondent to the lower receivement walls 46 of the first and second mold portions 12, 14.

FIG. 7B is an enlarged view of a portion of the base plate 42 showing another embodiment for aligning and securing the first and second mold portions 12, 14 to the base plate 42. The first portion 12 of the mold system 10 is shown in FIG. 7B and the second portion 14 similarly connects to the base plate 42. The base plate 42 may include a recess 42a to temporarily receive a mold portion 46 on a lower portion of the first and second mold portions 12, 14. In use, the recesses 42a may be filled with frosting or other edible substances prior to inserting the mold portions 46 into the recesses 42a to prevent any leakage during the mold filling process. In some embodiments, an outer rim support leg/flange 42b may be included on the plate 42 to add more rigidity to the plate 42. FIG. 8 represents a cross-sectional taken at line 7-7 of FIG. 6 showing another embodiment of mold system 10 utilizing one or more spikes 50 to, in some instances, temporarily secure the inner portion cake core 18 during application of outer portion 16 such as liquefied chocolate by resisting lateral forces as previously described. The spike 50 has a height and width of size and shape relative to the mass of the finished edible composition. The spike portion 50a is preferably round but can also be square, oblong or even cross or star shaped and is configured to insert into the inner portion cake core 18. To maintain plumbness, the spike 50 may include a lower portion 50b that has an outer wall surface 50d that corresponds and mates into a recess portion 43a of the work surface 43. In this embodiment, the lateral load from the inner portion cake core 18 is transferred from the upper portion 50a of the spike 50 to the much stronger work surface 43. In some embodiments, more than one spike may be used for stabilizing the inner portion cake core 18 depending on the size and shape of the inner portion cake core 18.

The base plate 42 may be used (a) to maintain the central position of the inner portion cake core 18 and (b) to resist relative forces during production and transport of the finished-decorated cakes 8. In some embodiments, the base plate 42, the recess 44 and the vertical mold portion 49 may be used in commercial cake production and shipping. In some embodiments, to restrict harmful movement of a finished cake 8, particularly during shipping, the recess 42a may be included on the base plate 42 that has outer dimensions that can mate and become adjacent to interior walls of a packaging container. In some embodiments, a ring or flap may be incorporated into the packaging that prevents vertical forces by mating with the base plate 42 around an outer periphery of the base plate 42. In some embodiments, including but not limited to wholesale production, one or both of the first and second mold portions 12, 14 may be utilized for packaging. In some embodiments, such as industrial mass production of formative-structural decorative cakes 8, the base plate 42 may include the center spike 50 corresponding to a centered hollow aperture formed into the inner portion cake core 18 to resist lateral movements. In some embodiments, the center spike 50 may be conically shaped to mate with a similarly shaped aperture in the inner portion 18, although any shape for the center protrusion may be used.

The work surface 43 can be of a thickness relative to a desired proper depth of the recess 43a. In some embodiments, the material for the work surface 43 may be engineered plastics such as a 'star-board'. In some embodiments, the material for the spike 50 may be stainless steel although other moment resistive materials like aluminum or even high strength plastics may also be acceptable depending on the dimensions and the mass of final cake 8. For ease of extraction after solidifying of the liquefied material, the flange 50e may also be incorporated into the lower portion 50b of the spike 50.

In other embodiments, one or more spikes having large diameter flat type heads may also be utilized with the base plate 42 and in some embodiments with the base plate 42 without the recess 44 included. In this embodiment, the vertical and lateral stability of both manufacturing and shipping operations is achieved by weight and mass forcing the spike to remain in a generally vertical position due to capturing the plate between the mass and above the flat head of the spike below in effect increasing the moment at the base of the spike and utilizing the surface area of the plate in contact with and beyond the flat head of the spike and decorative cake mass above.

FIGS. 9-12 illustrate an embodiment of a securement device 100 that may be used with the mold system 10. In some embodiments, the securement device 100 may be used together with the base plate 42 described above, with or without the spike 50. In yet other embodiments, the securement device 100 may be used alone to stabilize the inner portion cake core 18 within the first and second portions 12, 14 of the mold system 10 for delivery of the outer portion 16 to the cavity 15 formed between the inner portion cake core 18 and the interior of the first and second portions 12, 14. FIG. 9 illustrates an embodiment of a securement device 100 including a central ring 100a having two opposing legs/prongs 100b extending from the central ring 100a. The securement device 100 may include a curved portion 100c that allows the legs 100b to extend more centrally into each half of the inner portion cake core 18. The curved portion 100c may be sided and shaped so that the curved portion 100c rests on the inner portion cake core 18 when the securement device is fully inserted. (See FIG. 11.) The central ring 100a may be circular, oval, square or rectangular or any shape that is configured to mate with the flange portions 12b, 14b that form the fill spout as described with reference to FIG. 10 below. In some embodiments, the securement device may have one, two, three, four or more legs 100b. The lengths of the legs 100b may vary depending on the shape and mass of the inner cake portion. In some embodiments the legs 100b may extend through 20-40% of the inner portion cake core 18.

The securement device 100 may be used to reduce or prevent horizontal and vertical movement of the inner portion cake core 18 by resisting the hydrostatic pressure created during the filling process of the cavity 15. In some embodiments, the securement device 100 may be made of stainless steel, aluminum or even high strength plastics but is not limited to these materials.

FIG. 10A illustrates the securement device 100 partially inserted into the inner portion cake core 18 through the opening 102 created by the flange portion 12b, 14b. The slots 12f, 14f formed in the flange portions 12b, 14b are shown in FIG. 10A before the central ring 100a is engaged in the slots 12f, 14f. As shown in FIG. 10A, the slots 12f, 14f may be formed at the connection of the first and second portions 12, 14 of the mold system 10. In some embodiments, the slots 12f, 14f may be formed elsewhere in the flange portions 12b, 14b as shown in FIG. 10B. FIG. 10A also illustrates the clips 25 that may be used to secure the first and second mold portions 12, 14 together.

Figure 11:
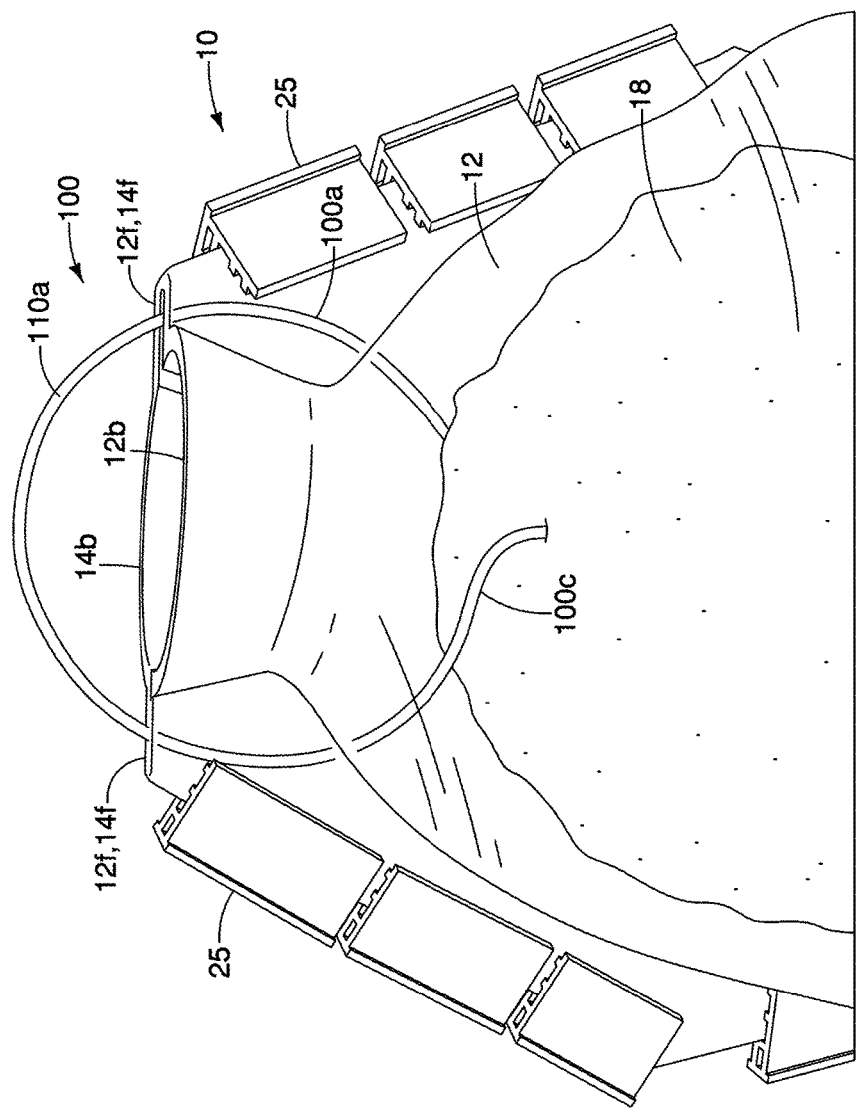
FIG. 11 illustrates an upper front view of the embodiment shown in FIG. 10 with the securement device fully inserted into the inner portion.

FIG. 11 shows an upper partial side view of the mold system 10 with the securement device 100 fully inserted into the inner portion cake core 18. The central ring 100a is shown positioned between the first and second mold portions 12, 14 and positioned within the slots 12f, 14f. The securement device 100 may be held firmly in place by the mold clips 25 that also secure the first mold portion 12 to the second mold portion 14. With the securement device 100 inserted into the inner portion cake core 18, the inner portion cake core 18 is secured for the addition of the outer portion 16.

Figure 12:
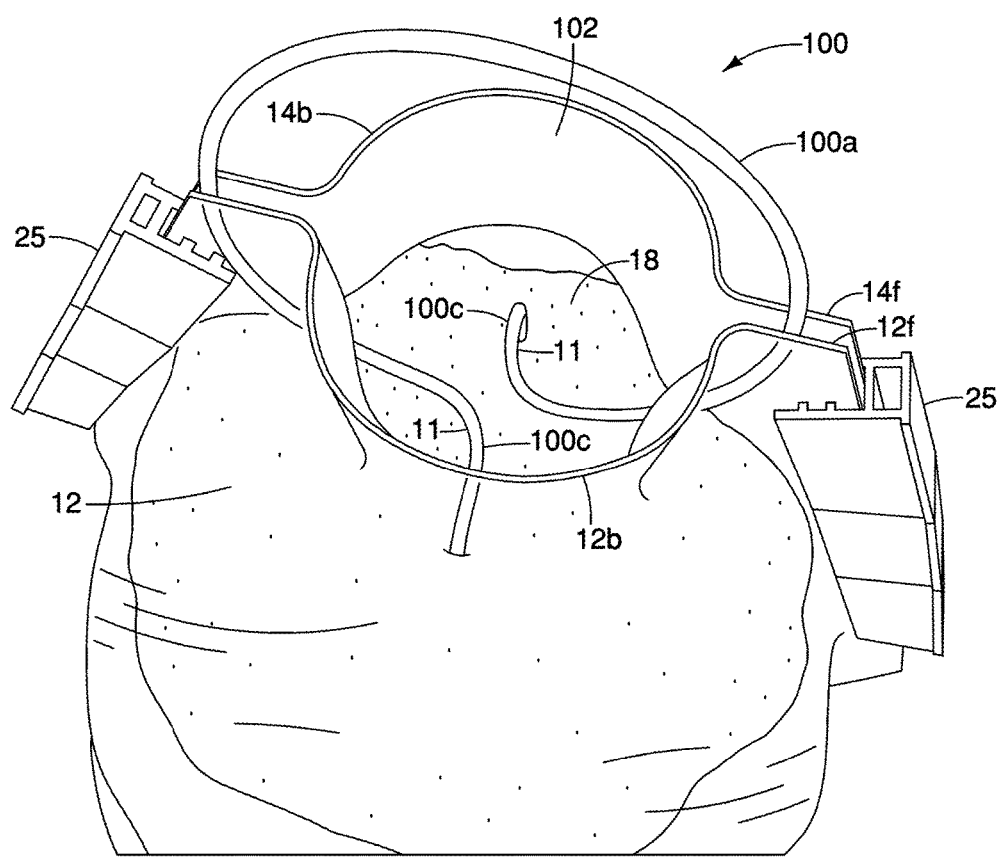
FIG. 12 illustrates a perspective top view the embodiment shown in FIG. 10 with the securement device inserted into the inner portion and secured within the mold system.

FIG. 12 is a top view perspective showing the securement device 100 with the opposing curved portions 100c locking down the inner portion cake core 18. In some embodiments, the opposing curved portions 100c lock down the inner portion cake core 18 by clamping inner portion cake core 18 between the opposing curved portions 100c and the base plate 42 shown and described above in FIGS. 6-8. In some embodiments, the inner portion cake core 18 may be formed from two inner portion cake cores 18 that may be mated together with frosting or icing and positioned within the first and second mold portions 12, 14. After the mold system 10 is filled with the outer portion 16 and sometimes prior to solidifying of the outer portion 16, the securement device 100 may be removed prior to de-molding the inner portion 18 covered with the outer portion 16. The securement device 100 may also be used with any of the embodiments described above, for example, but not limited to embodiments including a fondant layer, a frosting layer and/or an icing layer as part of the outer layer.

In some embodiments, the first mold portion 12 and the second mold portion 14 may be made from a clear material, such a clear plastic material. The clear material allows the user to see that the inner portion 18 is properly placed within the mold assembly 10 and to see when the cavity 15 is full. For example, the clear plastic material may polyethylene terephthalate-glycol (PETG). Other materials may also be used such as other type food grade plastic or flexible mold materials such as silicone rubbers, silicone, latex, and other like rubbers or other materials like metals such as aluminum or copper but are not limited thereto. In some instances, a combination of both a rigid and a flexible mold portion may also be used. In some embodiments, the first and second mold portions may be provided with a silicone coating/de-nesting agent. In some embodiments, some or all of the components of the mold system 10 may be reusable whereas in other embodiments some or all of the components of the mold system 10 may be disposable.

Figure 17B:
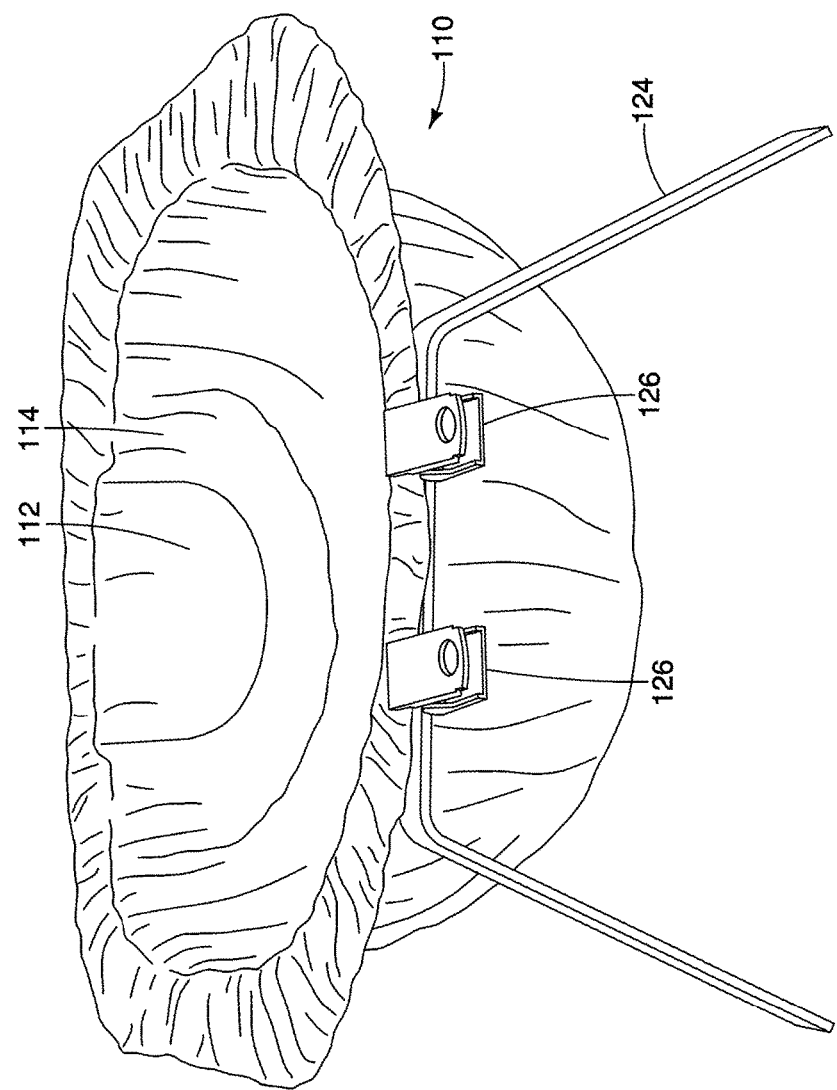
Figure 18:
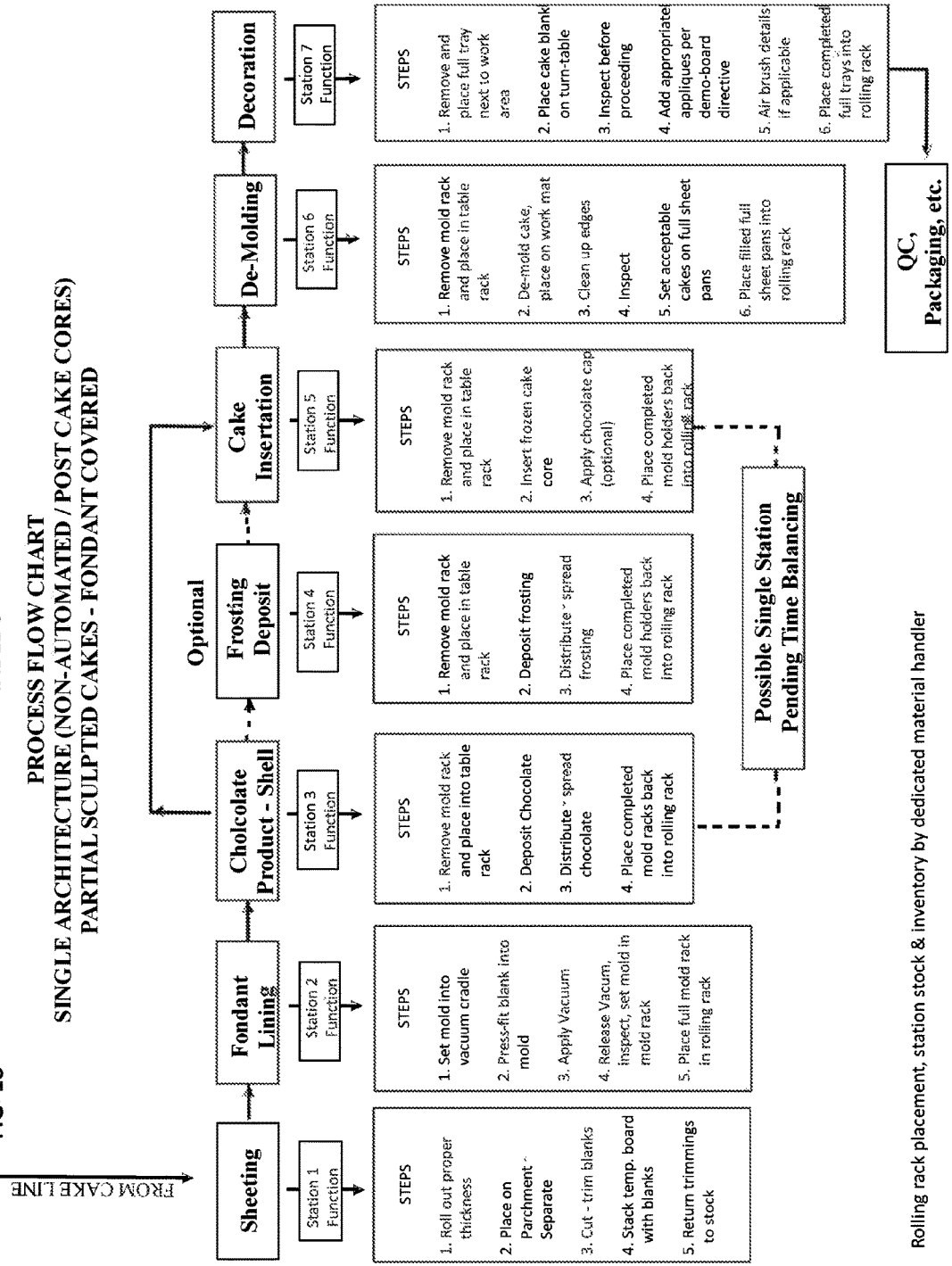
FIG. 18 shows Table 3 depicting an embodiment of a flow chart for preparing an edible composition.
Figure 19:
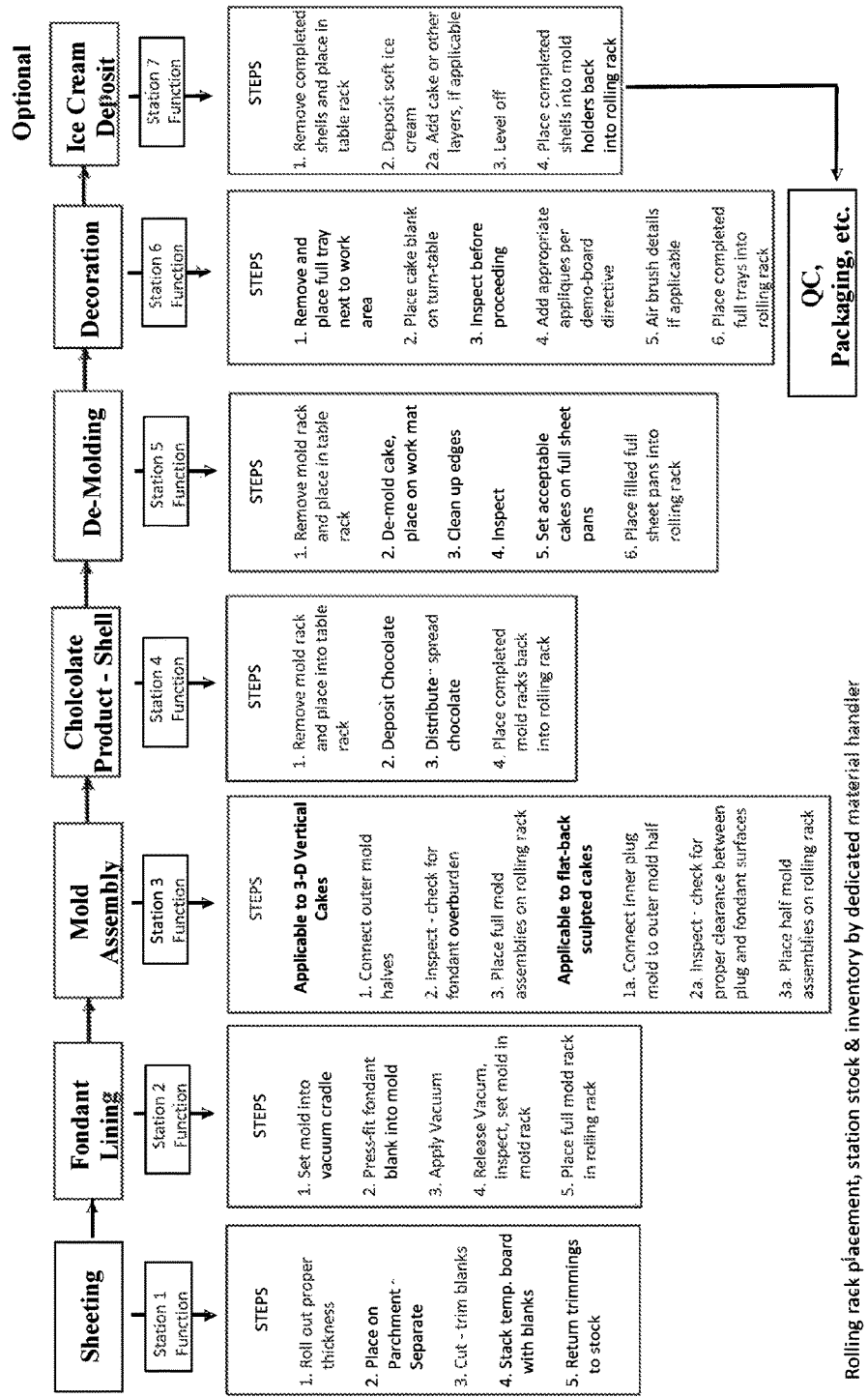
FIG. 19 show Table 4 depicting an embodiment of a flow chart for preparing an edible composition.
Figure 20:
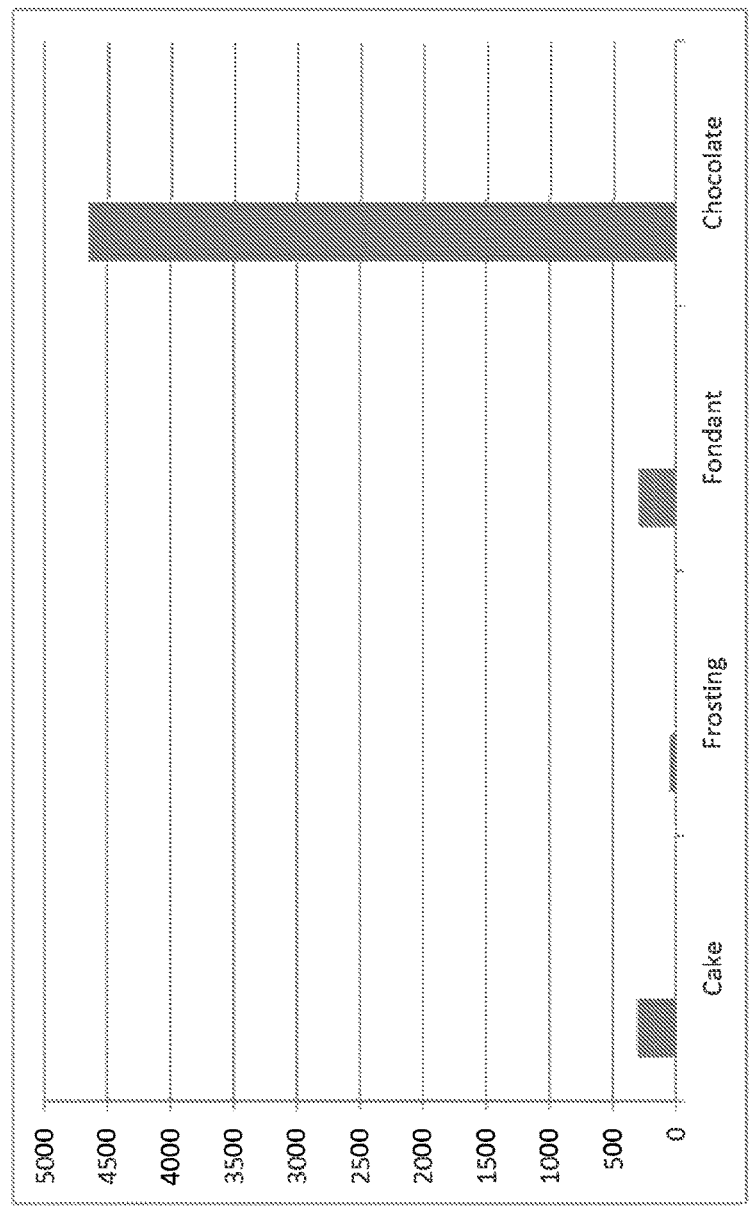
FIG. 20 shows Table 1 depicting strength to weight ratio.

FIGS. 17A and 17B illustrate pans 110 that may be used to form the inner portion 18 of the edible compositions described above. The pans 110 may include a shape that is similar to the first mold portion 12 and the second mold portion 14. For example, the pan 110 includes a recess 112 formed in a wall 114 of the pan 110 that corresponds to the protrusion 79 in the inner portion 18 described above and the recess 120 in the pan 110 corresponds to one feature 20. Additional recesses 120 may also be included in the pan 110 to correspond to features 20 in the mold system 10. In some embodiments, the pans 110 are pressed aluminum to stabilize the pan 110 during filling and baking. In some embodiments, stabilization is needed due to a rounded rectangular shape having one end greater than the other that can tip or shift during filling or baking. In some embodiments, a support structure 124 may be included to stabilize the pan 110. In some embodiments, the support structure 124 may be a "C" type leg or a trapezoidal leg that can be clamped to the shallower end for levelness. The support structure 124 may be secured to the pan 110 using one or more clips 126. In some instances or instead of using clips 126, the end of the pan 110 may be folded under itself forming a retainment slot for the support structure 124 for securing support structure 124 to the pan 110. The support structure 124 may be made of metal or any other material that can be heated.

After baking the inner portion 18, it may be desirable for taste to include frosting either by 'hollowing' out a portion inner portion 18 and or in some embodiments that utilize two baking pans, the two inner portions are mated and secured to one another also using a frosting. Once the inner portion 18 is removed from the pan 110 and optionally frosted or secured together to another inner portion 18, the inner portion 18 may be used with any of the mold systems described herein.

Instead of cake or other mainly flour based products, inner portion 18 can be formed by using a frozen yogurt, fruit and granola composition. This embodiment first begins by taking pan 110 and applying a layer of yogurt approximately ⅜" to ½" in thickness over the inside portion. The next step is to place sliced fruit, for example strawberries, into the previously applied yogurt, after which another layer of yogurt is placed over the fruit slices. At this stage, pending the overall width and depth of pan 110, the volume area of the remaining mass will be 'bowl like'. In the next step, granola or even crushed cookies are layered into the previously applied yogurt by sprinkling and pressing the dry product into the thick, creamy yogurt. The final step would involve first mixing some cut up fruit and yogurt and depositing into the balance of the previously described 'bowl' like cavity.

The previously described process is repeated in matching pan 110 and then placed into a freezer for hardening. In some embodiments a single pan 110 can be utilized by removing the inner portion (after which return to freezer) and repeat the process over so that in either application the object is to have two matching half portions. Upon completion (frozen, then demolded) the two halves are combined to create a complete inner portion 18 by the same method for cake or other flour products except instead of using icing to adhere the halves to each other, yogurt is used. In some embodiments, the combined—single unit inner portion 18 is placed into a freezer until just before being used. The decorative dessert is then completed also as previously described and made ready to serve a chocolate, fresh fruit and yogurt treat. The preferred yogurt is a 'Greek' yogurt that is strained at least 3 times so that most of the liquid is removed and the yogurt is then of a much thicker consistency and stronger flavoring.

Methods of forming the edible composition 8 are also described herein. In some embodiments, the methods include forming the edible composition 8 having an inner portion cake core 18 with the outer portion 16 that comprises chocolate. The inner portion cake core 18 may include a cake or an ice cream cake or other core such a brownie or a muffin. In some embodiments, the methods include forming the edible composition 8 having an inner portion cake core 18 with the outer portion 16 that comprises chocolate and fondant. In some embodiments, the methods include forming the edible composition 8 having an inner portion cake core 18 with the outer portion 16 that comprises chocolate and fondant and/or icing/and/or frosting. Optionally, additional features may be added to the edible composition 8 after the edible composition is demolded. The edible composition 8 may be formed using one mold portion or two or more mold portions. In some embodiments, the methods may also include forming the cake composition to be used in the mold system 10. The methods described herein may be used to form an individual edible composition 8 or may be applicable to commercial use where multiple edible compositions 8 are formed.

In some embodiments, the inner portion cake core 18 may be positioned within the first and second mold portions 12, 14 so that the cavity 15 is formed between the inner portion cake core 18 and the interior of the first and second mold portions 12, 14. The spacers 17 may be include to facilitate the spacing to form the cavity 15. In some embodiments, the inner portion cake core 18 may be secured relative to the first and second mold portions 12, 14 using the base plate 42 or the securement device 100 described above. In some embodiments, the base plate 42 and the securement device 100 may be used together to secure the inner portion cake core 18. The spike 50 may also be used with any of the methods. The first portion and the second portion 12, 14 are secured together and the fill spout is formed at or near the top of the mold system 10, for example, by connecting flange portions 12b, 14b together. The outer portion 16 in a flowable form, for example liquefied chocolate, may be added into the fill spout so that the cavity 15 becomes filled with the outer portion 16. In some embodiments, the outer portion 16 may be added by pouring the outer portion into the fill spout, by injection, such as high speed injection or any other method suitable to fill the cavity 15. In some embodiments, a vacuum or positive pressure may be used to facilitate filling the cavity 15. In some embodiments, the mold system 19 may be chilled to facilitate solidifying the outer portion 16 in the cavity 15. Once the outer portion 16 is no longer flowable, the mold system 10 may be removed. Optionally, additional features may be added to the edible composition 8.

In some embodiments, the edible composition 8 may include a fondant outer layer in addition to a chocolate outer layer. The fondant layer may be the outermost layer of the edible composition 8. The fondant layer may be pressed or vacuum formed into one or both mold portions 12, 14 depending on the final design of the edible composition 8. The methods including vacuum forming the fondant not only provide greater and better detailing in a much faster and cost effective way, vacuum forming also permits the fondant to be applied in a much thinner application. In addition, the fondant when veneered with chocolate can be used to make the high sugar content of the overly sweetened fondant more palatable. Once the fondant is positioned in the mold system 10, the inner portion cake core 18 may be secured in the mold system 10 and the flowable outer portion 16 may be added as described above, for example, using the flowable chocolate to secure the fondant to the cake. As used herein, flowable refers to any liquid or pliable food product that can be shaped or molded. By way of non-limiting example, the flowable food product may be chocolate, fondant, icing, frosting or candy.

To aid in the release of the fondant or other final material from the mold system 10, the apertures 12d, 14d allow a positive air pressure to be applied to the outermost layer forcing the edible composition to separate from the first and/or second mold portions 12, 14. Other release methods like using silicone molds (sometimes having mother molds) or pre-coats may also be used with the mold system 10.

Fondant is not ideal for all designs. Unless the fondant is supported, the fondant does not generally hold it's shape. For example, protrusions, large surface undersides and recesses and the like are very difficult to execute with fondant. Further, a smaller surface is easier to cover than a large surface. Basically, a cake that is taller than it is wide, especially a dimensional cake having horizontal protrusions, undercuts, etc. is more challenging to cover than a cake that is wider than it is tall and not having exacting details or shapes. Using the mold system 10, including a fondant layer on any size and shape edible composition 8 is simplified.

In some embodiments it may be desirable to utilize the mold system 10 and methods described herein to create tall, structurally sound, decorative cakes by laminating two or more different, first liquefied, confections such as candy, icing, or frosting, ganache, fondant (both rolled and liquid), caramel or even ice cream. For example, liquefied fondant—in this embodiment the rigidified 3-D cake as previously described in FIGS. 1-3 is first produced whereas chocolate hull 16 (now hardened) becomes the support surface and form for the liquid fondant 19a upon solidifying and mold 12 removal creating a seamless structurally sound fondant covered cake.

In some embodiments, pending a person's skill level, it may be desirable to not bake the cake form, but take a cake mass as previously described and 'carve' the cake mass to create a cake form. Though anticipated as another embodiment of the present invention, the pre-described method ramification would require an advance skill level and additional cost in both time and product In other embodiments, to rigidify and in some instances create small cantilevered or 3-D features on a decorative cake, it may be desirable to thin the chocolate to a warm paste consistency by adding heavy cream. In this embodiment an appropriate amount of chocolate paste is spread evenly to a thickness slightly more than the space 15 between cake form 18 and molds 12, 14 interior surface, or in some embodiments between the fondant and the cake form after fondant is placed into molds 12, 14 prior. After applying the appropriate amount of paste, the cake core is placed into one mold half and pressed into the first mold half beginning at the bottom and working towards the top. This compression pressure performs in the same manner as the previously described hydrostatic pressure insuring proper paste distribution. In this embodiment the previously described 'fill spout'/aperture now performs as an exhaust port for any excess paste. In some embodiments it may be preferable to apply the paste to the cake core only prior to pressing together. In other applications the paste can be added to both molds and the cake core.

In some instances it may be preferable to first cool or even freeze the molds to aid in the complete covering of the molds interior. Sometimes it may be desirable pending paste's viscosity, and finer mold detailing a thin covering is applied to the interior surface of the molds which are then placed into a freezer to first harden prior to applying the paste as previously described. This can help ensure complete coverage of any areas observed through a clear-transparent mold.

As part of the process the mold halves are secured to each other as previously described. In some embodiments it may be preferable to have the mold halves 'hinged' together with a latch/securement device-s relatively opposite of hinge. Or even utilize just one mold half to create a detailed—flat back cake. After securement and removal of excess paste, the filled mold is sometimes placed into a freezer for solidifying of the newly formed chocolate hull to provide clean separation molds and hull during the de-molding process.

In other embodiments pending the decorative cakes size, shape, features, (liquefied fondant ganache and icings) thickness of hull, relative movement and time of serving other paste like compositions as previously described may also be utilized in the present inventions applied-pressure-form process for encapsulating a cake with a decorative hull.

In some embodiments it may be preferable to use only two half molds—one for creating the cake form mold and another for adding a covering to the cake mold. Examples would be half a ball, shoe, animal or other objects having a gradient to point generally above and to the center away from a beginning point at or near the object and the surface area it is resting upon, whereas only a portion of the objects surface is seen as in nature.

The following embodiment is primarily directed to commercial production of wholesale decorative cakes to include direct line manufacturing per Table 3 outlining both the method and the process.

Table 3 describes one embodiment using the mold system 10 and methods applied to production of wholesale frozen decorative 3-D fondant covered cakes. The above Table 3 illustrates a manufacturing process primarily directed to, but not limited to, 'flat back' dimensional sculpted cakes similar to-as described in FIGS. 3C and 3D. The method and process described is also applicable to the 3-D taller than wide cakes as previously described and other 3-D cakes having a support surface area less than 20-25% of that shown in FIGS. 3E and 3F.

Regarding FIG. 3D, conventional ice cream cakes are limited to only flat-back cakes almost always having a width always greater than a height due to how they are typically produced—depositing soft ice-cream into a mold, freezing, frosting and then adding more frosting as a means to add detail, then re-freezing for storage. Basically, the ice cream cakes have all the same challenges and issues associated with other conventional baked and decorated cakes.

One embodiment to produce an ice-cream cake is to utilize the mold system 10 to manufacture a fondant cover secured to a support hull filled with one or more layers of ice-cream. For example, the mold system 10 provides a system and a method to produce 3-D ice-cream cakes having a height greater than a width of the cake, including projections—cantilever and a finish surface covering like fondant to accessorize and even air brush details, none of which is possible with currently used methods of forming ice cream cakes. One of the keys to using fondant on any type of cake is to keep it away from moisture. Ice cream cakes present a particular problem with moisture since the temperature of the ice cream when exposed to ambient air, cause the exterior of the fondant to condensate immensely resulting in loss of detail and dimensioning then quickly turning into a 'gooey' mess. In contrast, the mold system 10 and the methods of using the mold system 10, allow the fondant to be used with an ice cream cake inner portion 18 while maintaining the strength due to the temperature of the ice cream inner portion 18 and the outer layer 16 support hull, for example made of chocolate. In addition, the ice cream inner portion 18 moisture content also does not affect the protective-support hull 16 which in turn now becomes a vapor barrier having 'X' amount of 'R' value (thermal resistance), depending on the masses and associated thermo conductivity of same.

In some embodiments, it may also be desirable to utilize mold system 10 to manufacture ice cream cakes having a cake core, covered in ice cream which is covered by a chocolate hull. In some embodiments, a fondant layer may also be applied as previously described.

In yet another embodiment, it may be desirable to produce just the rigid fondant covered hulls for other fillings besides ice cream, like 'cake mush' (used to make cake pops), chocolate mousse, custard, etc. even wrapped candy a fun filled birthday cake surprise. In this embodiment the fondant covered hulls are produced by first mating the fondant with the desired mold arrangement and then coating the interior of the fondant with a liquefied/paste-like chocolate utilizing a 'plug mold' for even distribution, slurring/rotational molding process or even spreading of a paste-like consistency. Another unexpected result of producing rigid fondant shells is the ease of attaching mostly vertical or horizontal 3-D fondant covered appendages such as arms, legs and even cars. For example, let's say our 3-D cake is a mouse having its ears positioned relatively as projections having their point of contact having an area less than 5-10% of its total mass. The ears are first molded to the desired size and shape preferably using chocolate. In addition the base of the cake has an extended dowel or key that corresponds to securement apertures. The ear's protrusion is first lightly coated-dipped into warm chocolate, inserted into previously described aperture, positioned as desired and held in place to harden with head. For added rigidity additional chocolate paste can be applied permitting accessibility to the inside of shell area adjacent and over the previously inserted protrusion.\

Though there are many different applications of creating a 3-D dessert, for example the previously described in this patent, flat back, bust, figure on back. The following Table 4 below described the process for manufacturing an ice cream cake having a height greater than its width, mass portions projecting beyond its base and covered in fondant though in other embodiments just the edible formative structure, preferably chocolate.

It is therefore intended that the foregoing detailed description be regarded as illustrative rather than limiting, and that it be understood that it is the following claims, including all equivalents, that are intended to define the spirit and scope of this invention.

The invention claimed is:

1. A mold system comprising:
  a first mold portion comprising a dimensional feature formed in a wall of the first mold portion, the first mold portion having a periphery and at least one aperture through the wall;
  a second mold portion having a periphery, the second mold portion being alignable to the first mold portion so that the periphery of the first mold portion aligns with the periphery of the second mold portion and an interior space is formed between the first mold portion and the second mold portion;
  a fill opening in an upper portion of the mold system and connected to the interior space;
  an opening in a bottom portion of the mold system and connected to the interior space;
  a base plate connected to the bottom portion for sealably connecting the first mold portion and the second mold portion to the base plate; and
  an inner portion of an edible composition, the edible composition having an inner portion having a dimensional mass and an outer portion, the inner portion positioned on the base plate and within the interior space so that a cavity is formed between the inner portion and at least a portion of the wall of the mold system forming the interior space, wherein the cavity extends to the base plate.

2. The mold system according to claim 1, wherein the dimensional feature corresponds to a cantilevered portion of the edible composition.

3. The mold system according to claim 1, further comprising a securement device.

4. The mold system according to claim 3, wherein the securement system comprises a conical portion sized and shaped to fit within the fill opening and a plurality of legs extending from the conical portion, wherein the legs are configured to be insertable into the inner portion to stabilize the inner portion relative to the first mold portion and the second mold portion.

5. The mold system according to claim 3, wherein the securement device comprises a loop portion and having at least one leg extending from the loop portion, wherein the at least one leg is configured to be insertable into the inner portion to stabilize the inner portion relative to the first mold portion and the second mold portion.

6. The mold system according to claim 5, wherein the fill opening comprises a slot and a portion of the loop portion is configured to be insertable into the slot.

7. The mold system according to claim 1, further comprising a plurality of apertures.

8. The mold system according to claim 1, wherein the base plate comprises a recess that is sized and shaped to receive a portion of the inner composition.

9. The mold system according to claim 1, wherein the base plate comprises a recess that is sized and shaped to receive the bottom portion of the first mold portion and the second mold portion.

10. The mold system according to claim 1, further comprising a pan for creating the inner portion.

11. The mold system according to claim 10, wherein the pan is sized and shaped to create the inner portion to fit within the interior space.

* * * * *